United States Patent Office 2,867,158
Patented Jan. 6, 1959

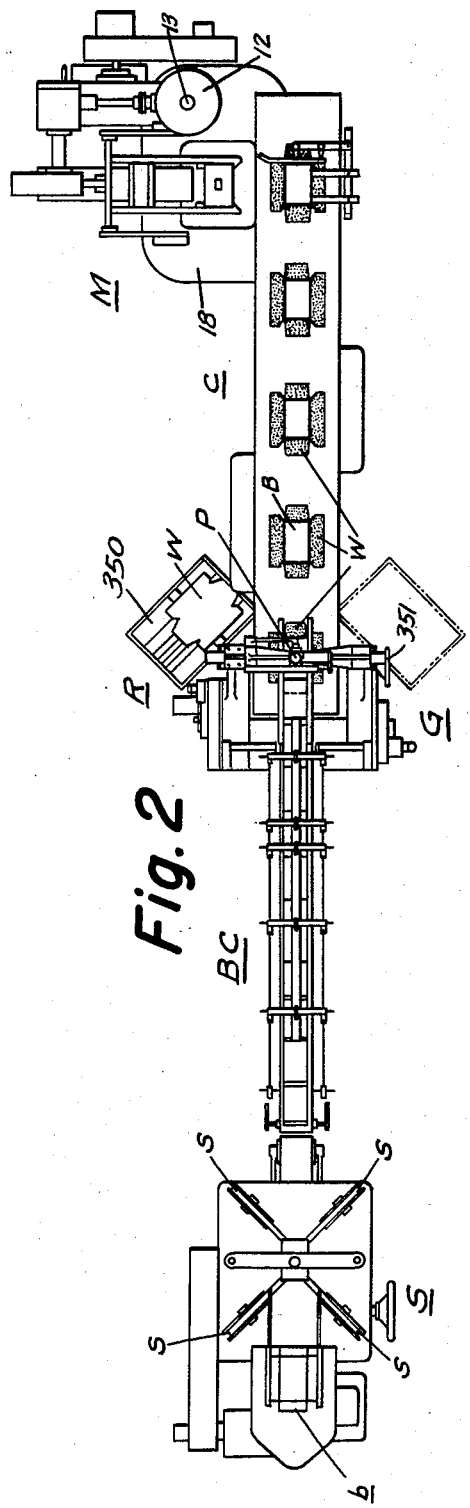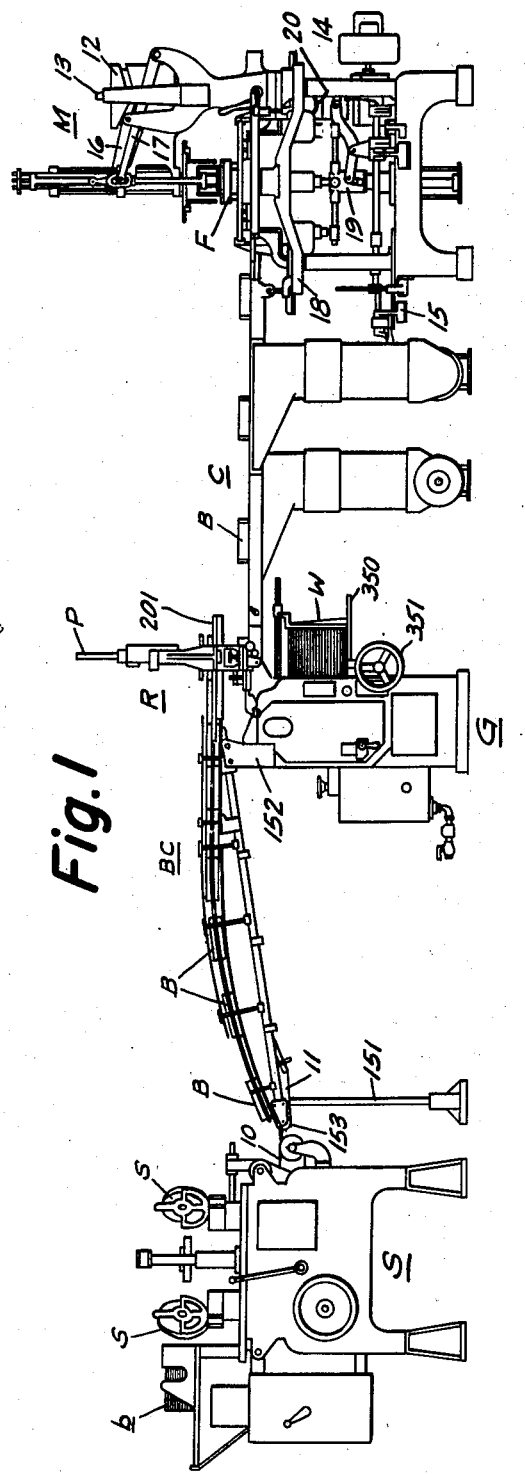

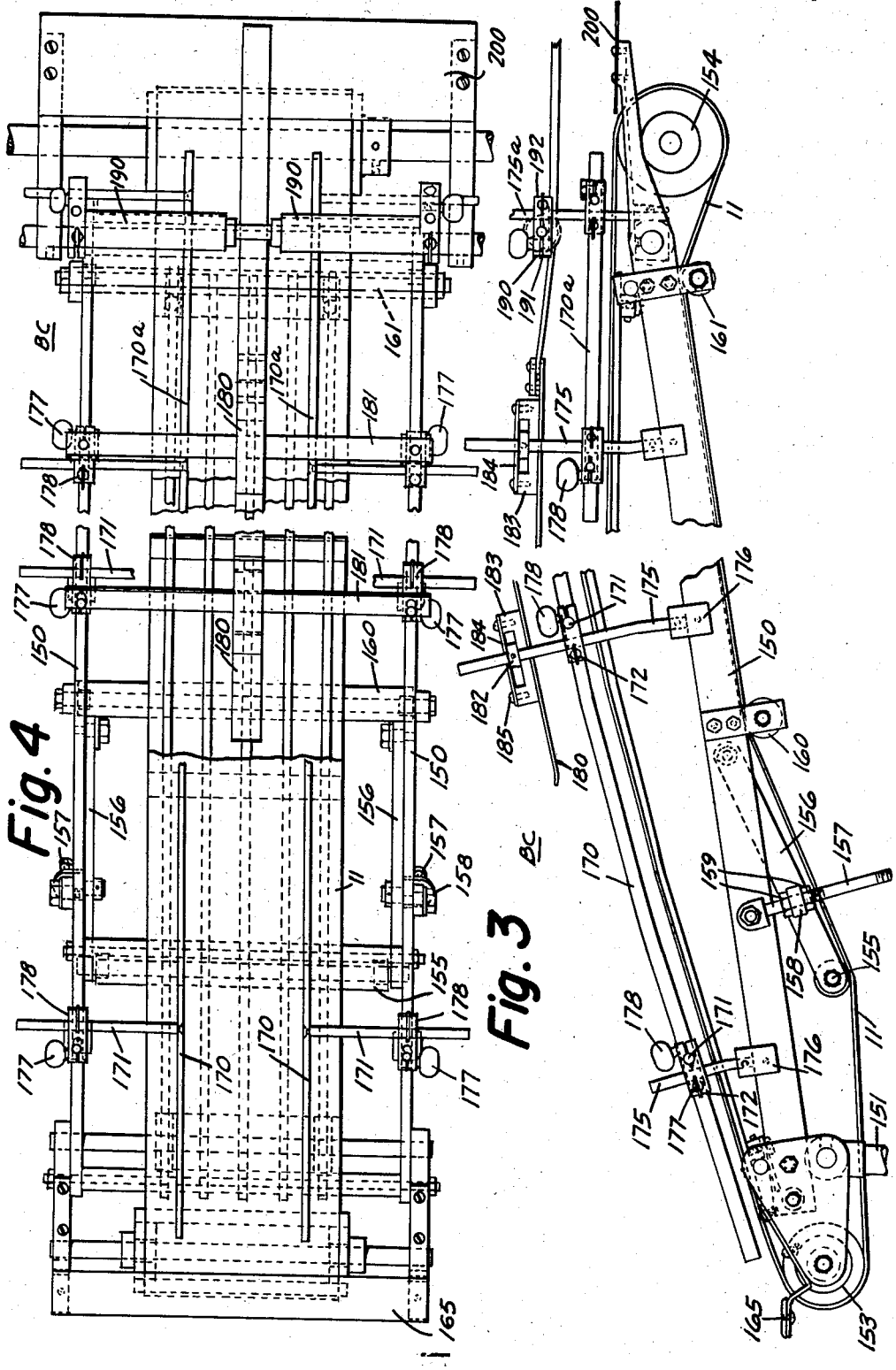

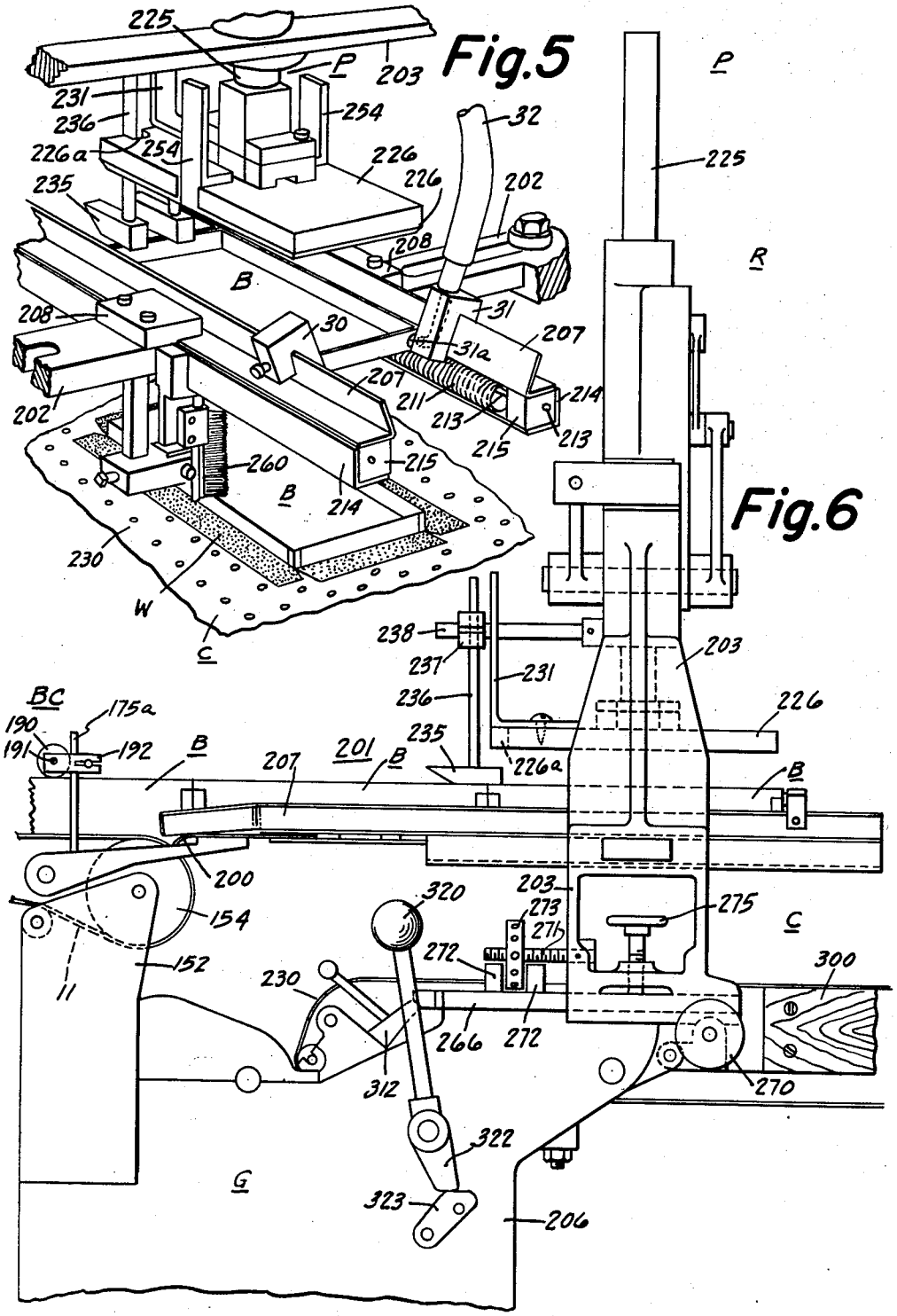

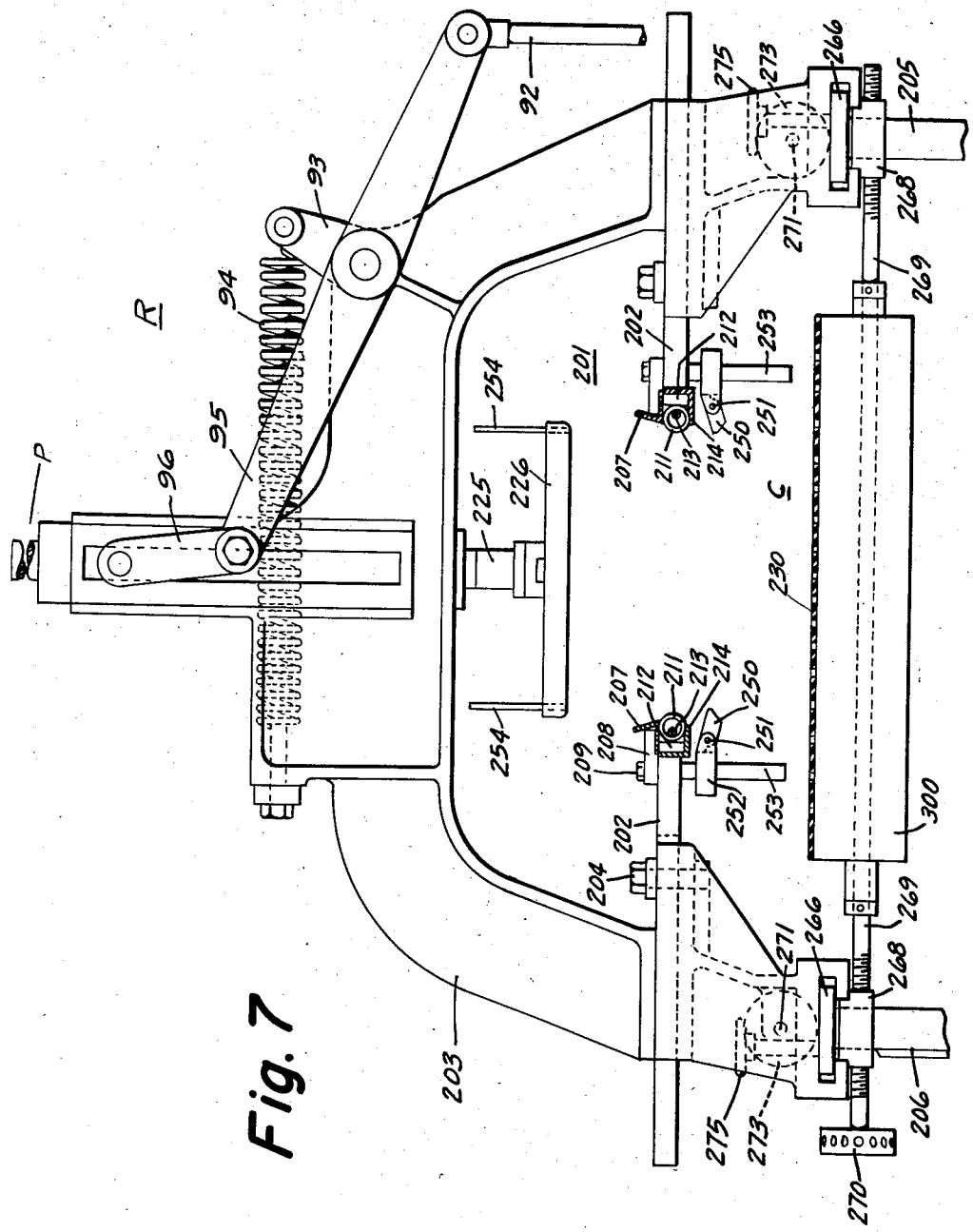

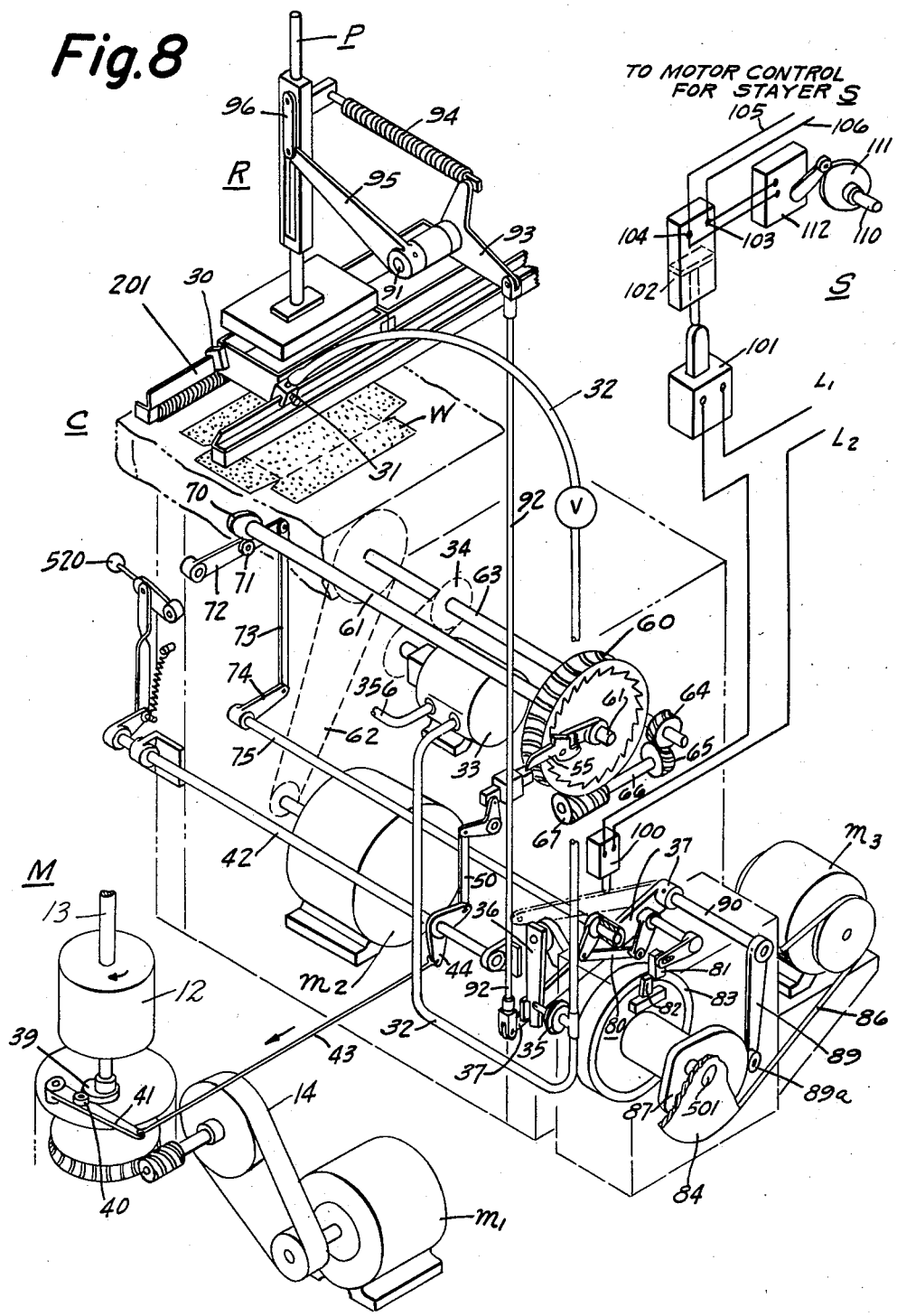

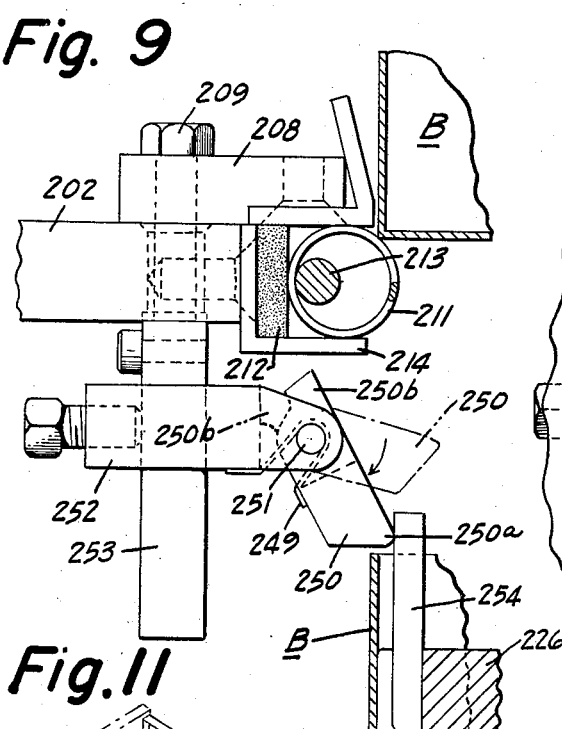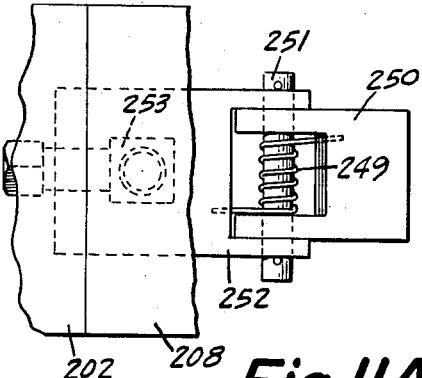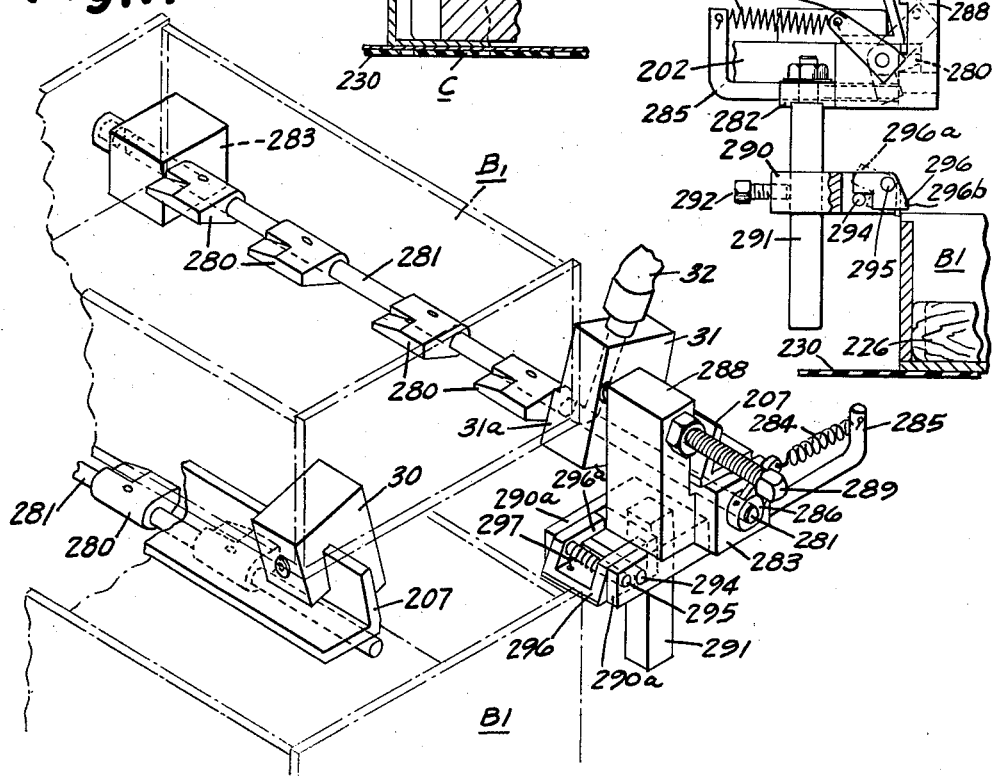

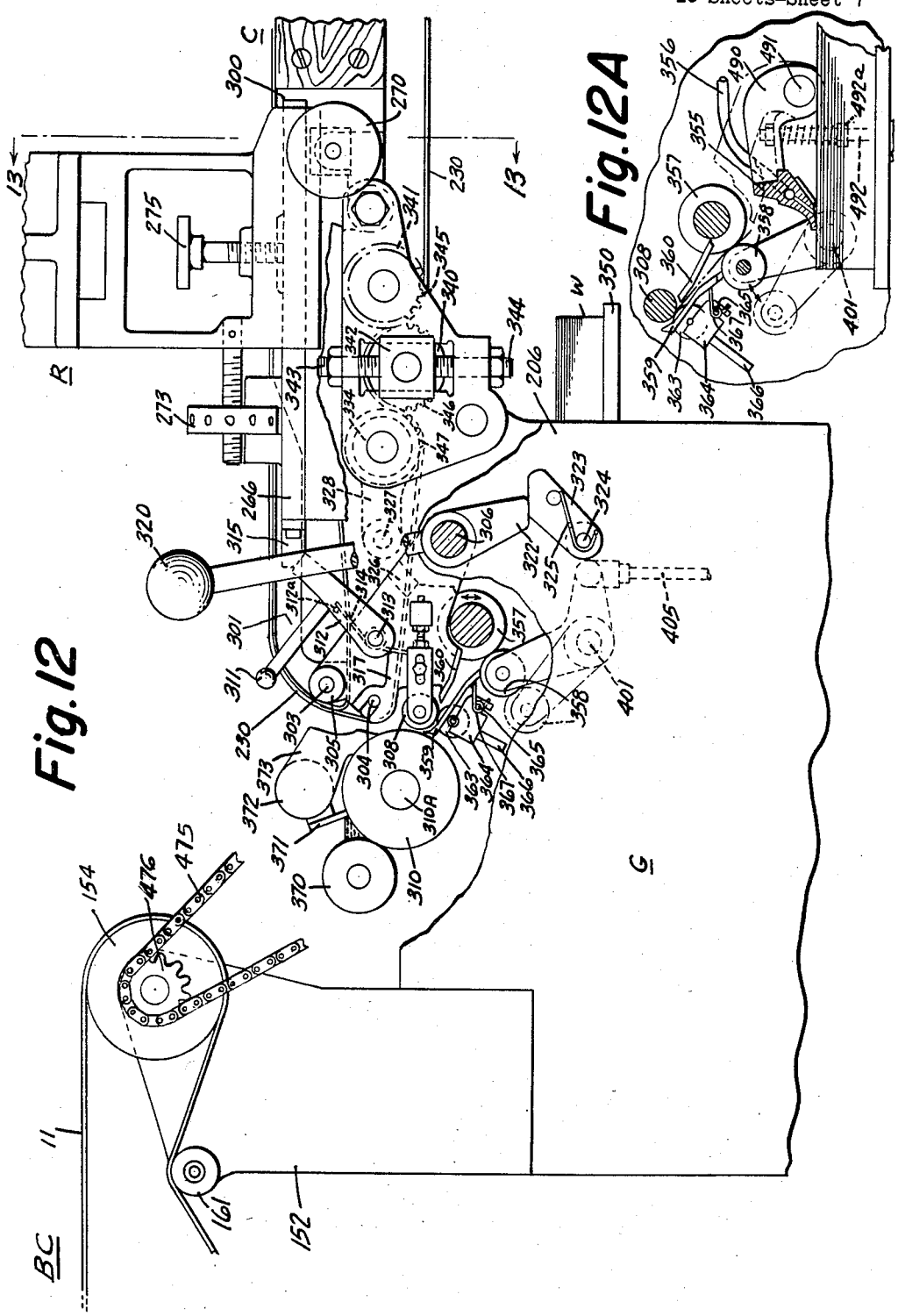

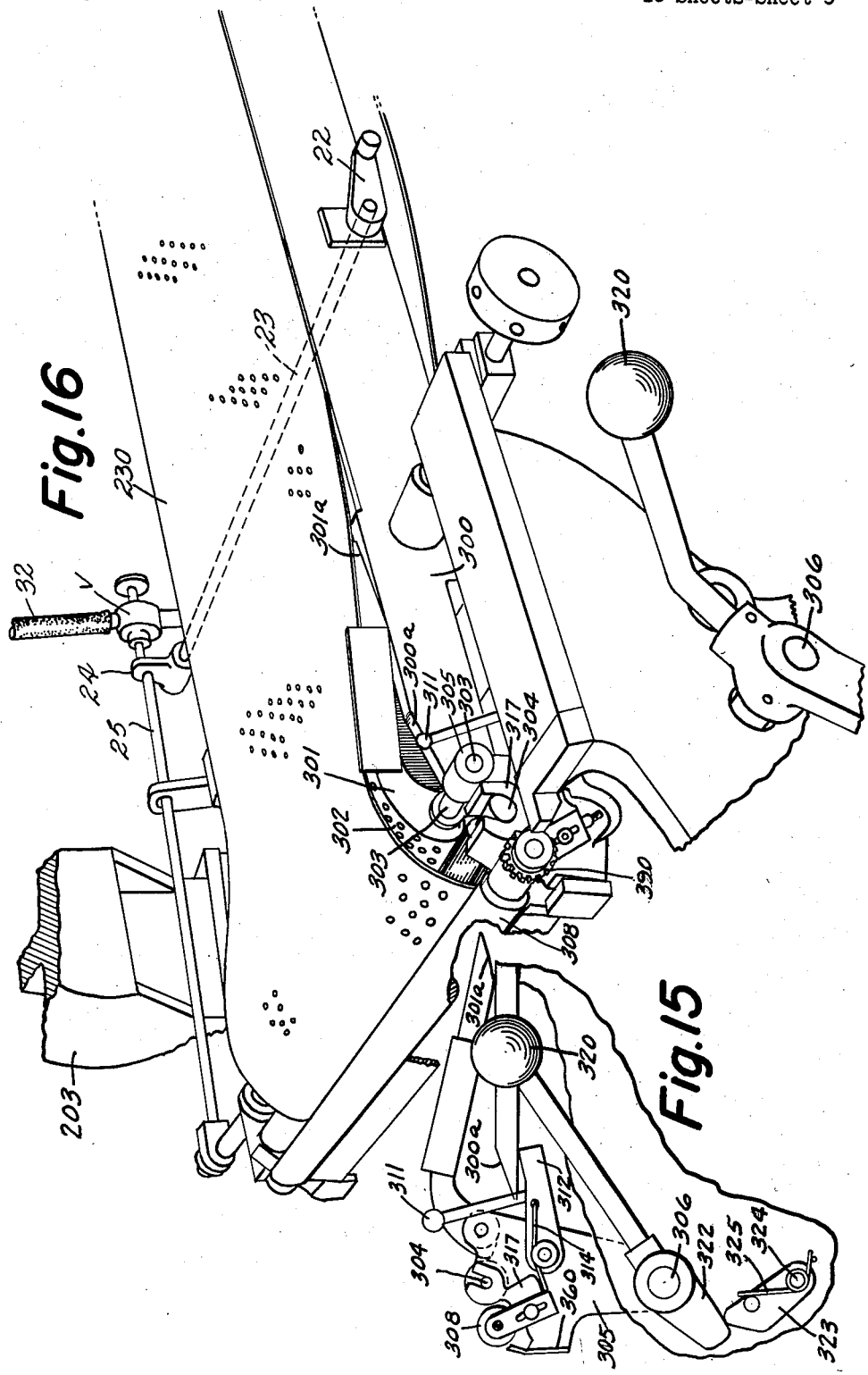

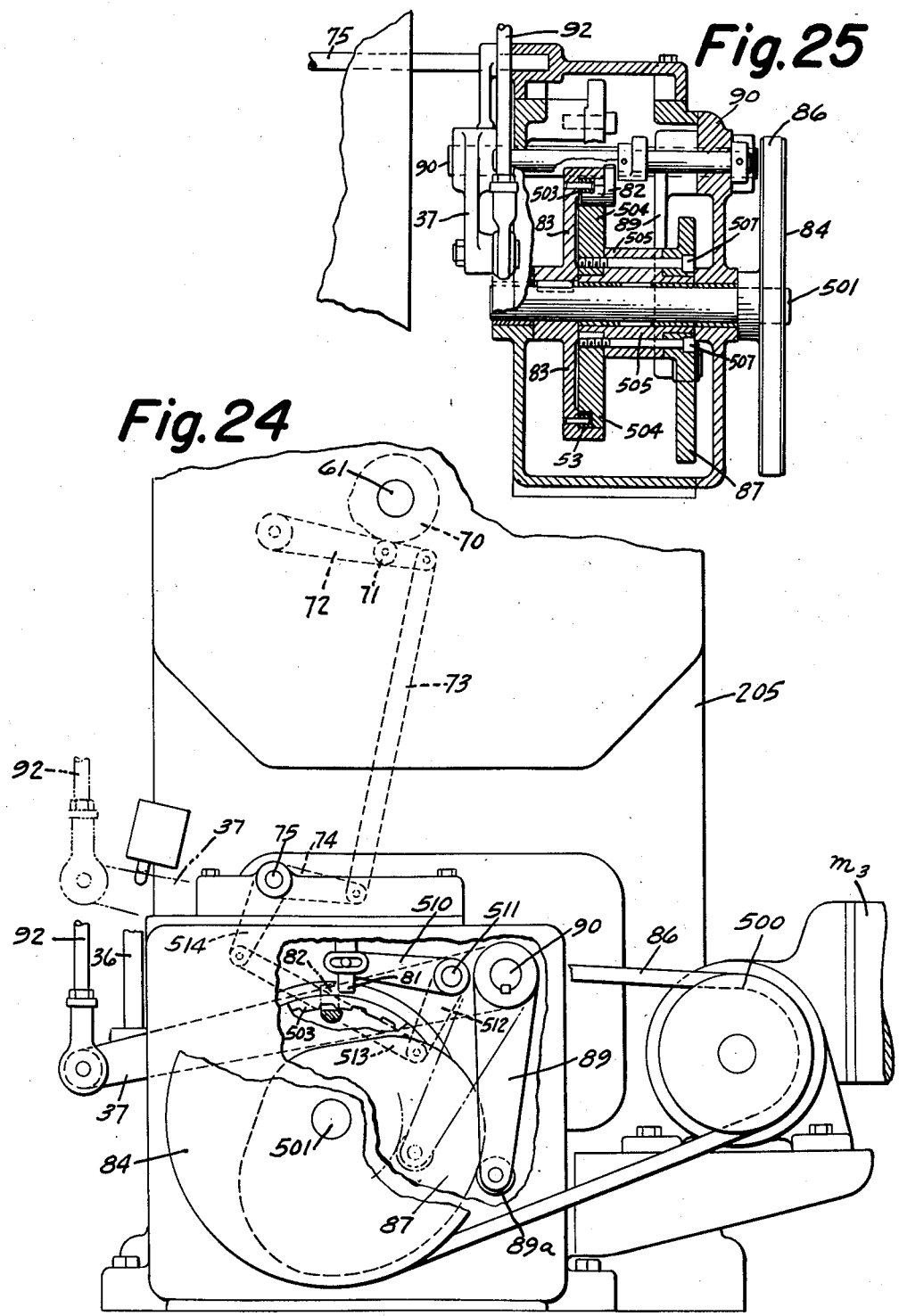

2,867,158

AUTOMATIC BOX WRAPPING SYSTEM

William F. Andresen, Jr., Contoocook, N. H., and Roy Schempp, Philadelphia, Pa., assignors, by mesne assignments, to Food Machinery and Chemical Corporation, San Jose, Calif., a corporation of Delaware Application April 4, 1955, Serial No. 498,914

21 Claims. (Cl. 93—54)

This invention relates to automatic systems for covering box components, containers and the like hereinafter generically termed "boxes." More particularly, this invention provides a box wrapping system of the "full automatic" type wherein box blanks and wrappers in the flat, once they are fed into the system, are not further handled by an operator until after their removal from the system as finished covered boxes.

The present invention is an improvement upon full automatic systems of the prior art, examples of which are the full automatic systems disclosed in Stokes U. S. Patents Nos. 2,016,462 and 2,111,700. In the present invention the box components in their different stages of completion pass through the system or machine in a substantially straight line path as viewed from above, thus utilizing a minimum of floor space and permitting two machines to be operated side by side or end to end simultaneously to wrap a box bottom and its complementary cover and to discharge the respective box components in finished condition at a common station for assembly into completed units.

The present invention relates particularly to full automatic systems of the type where box blanks are fed to a staying machine where they are stayed and thereafter fed as set-up boxes to an assembly station. At the assembly station each set-up box is automatically deposited on an adhesive-coated wrapper and thereafter both are fed as a box and wrapper assembly to a box wrapping machine where the wrapper is completely applied to the set-up box. While all of the operations or steps in a full automatic wrapping system are important and each must be performed in timed relation with the other, the most important operation is that of registering a set-up box in a precise position on a wrapper when both arrive at the assembly station. In box wrapping systems of the semi-automatic type such as described and claimed in the copending application of Lange et al., Serial No. 181,732, filed August 28, 1950, and issued April 12, 1955, as Patent No. 2,705,905, the registering operation at the assembly station is performed by an operator who places the set-up box on each of the wrappers to form box and wrapper assemblies. Inasmuch as this operation is performed by an operator, various changes in operating conditions can be compensated for by the operator without impairing the operation of the system. For example, if the wrapper conveyor does not deliver a wrapper to precisely the same location with each cycle of the system, the operator merely moves the set-up box to his right or to his left in assembling a set-up box on the wrapper. Thus any misalignment in the feed of the wrappers by the wrapper conveyor would probably not even be noticed by the operator. In fact, in box wrapper conveyors of the type disclosed in the aforesaid Lange et al. patent, the alignment of the wrappers on the wrapper conveyor is accomplished from the leading edge of the wrapper, and thus when a change in wrapper size is made from a small wrapper to a large wrapper, the center line of the assembly station, where the operator assembles a set-up box on a wrapper, is in effect moved to the left of the operator, assuming that the wrappers are being fed from left to right with respect to the operator. Such variations in alignment of box wrappers would impair the effectiveness of a full automatic system and therefore cannot be tolerated.

Accordingly, it is one of the objects of the present invention to provide a full automatic box wrapping system wherein it is insured that the set-up box will be registered on the wrappers in a precisely aligned position even for different sizes in order that the finished box will be properly wrapped and at output speeds as great as forty or more boxes per minute. There are various novel features of the box conveyor, the registering device, the gluer and the wrapper conveyor which all contribute to the automatic registration and assembly of the set-up box and its associated wrapper, as will be hereinafter pointed out and described more in detail.

For a more detailed disclosure of the invention and for further objects and advantages thereof, reference may be had to the following description taken in conjunction with the accompanying drawings in which:

Fig. 1 is a front elevation of the automatic box wrapping system;

Fig. 2 is a top plan view of Fig. 1;

Fig. 3 is a front elevation on enlarged scale of the box conveyor with parts broken away;

Fig. 4 is a plan view of Fig. 3;

Fig. 5 is a perspective view of the box support and box plunger of the registering device;

Fig. 6 is a side elevation of the box plunger and its associated parts;

Fig. 7 is an end view of the box support and box plunger looking toward the box conveyor;

Fig. 8 is a schematic view showing the control for the complete system as viewed from the rear of the system in Figs. 1 and 2;

Fig. 9 is a fractional view on enlarged scale of a box support and box stripper;

Fig. 10 is a top plan view of Fig. 9;

Figs. 11 and 11A show a modification of the box supports and associated structure shown in Figs. 5 and 9;

Figs. 12 and 12A are fractional views partly in section showing the conveyor nose and associated wrapper feeding and gluing mechanism;

Fig. 15 is a fractional view on enlarged scale of the latching mechanism in Fig. 14;

Fig. 16 is a perspective view of the telescoping conveyor nose;

Fig. 24 is a fractional elevational view on enlarged scale of the plunger operating mechanism for the registering device; and Fig. 25 is a sectional view of the mechanism shown in Fig. 24 with parts broken away.

Figure 13:
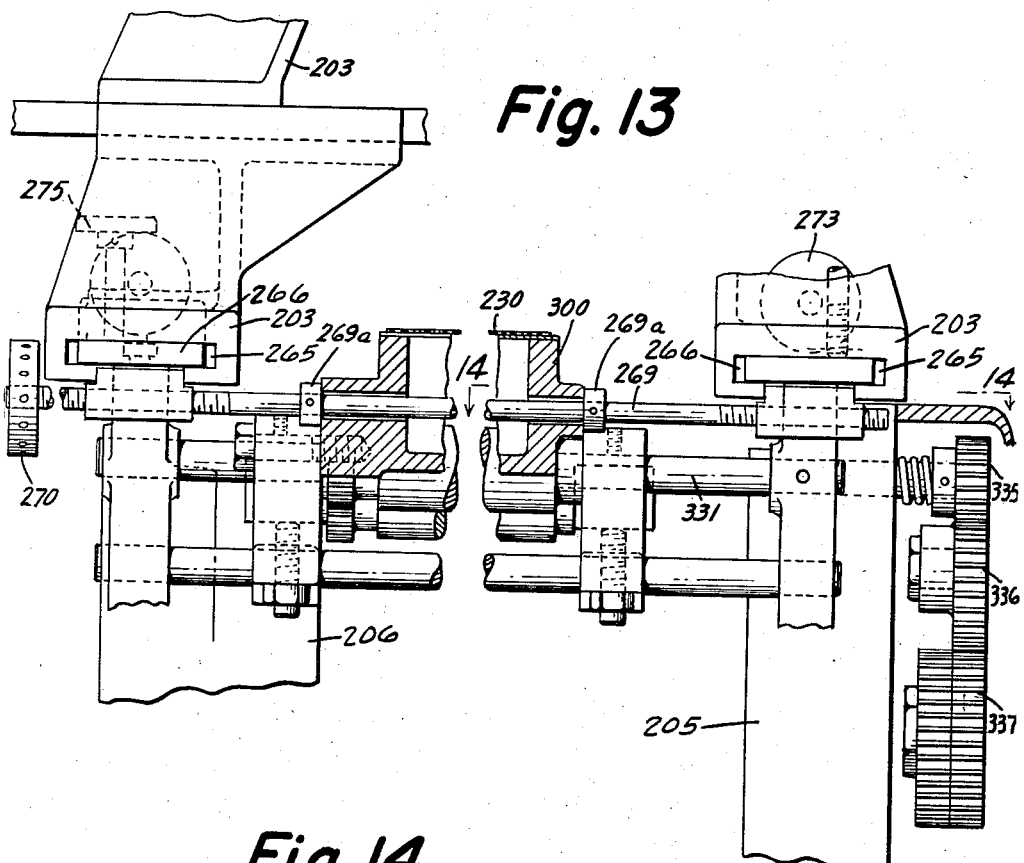
Fig. 13 is a sectional view taken along the lines 13—13 in Fig. 12.

Referring to Figs. 1 and 2, the full automatic box wrapping system includes as components thereof a stayer S, a box conveyor BC, a box registering device R, a gluer G, a suction conveyor C and a box wrapping machine M. The stayer S may be of any suitable type such, for example, as of the type shown in Davis et al. Patent No. 728,086, and the adhesive on the stays $s$ may be either of the water activated type or the heat activated type. The box blanks $b$ are illustrated as precut and fed to the machine from a stack of blanks $b$ in Figs. 1 and 2. The staying machine S is shown as a quad stayer and thus the four corners of the box are stayed concurrently. The box blanks $b$ thus automatically are transformed by the stayer S from blanks $b$ in the flat to stayed set-up boxes B. As they leave the staying machine S, the set-up boxes B are delivered in succession from a belt 10 of the staying machine onto the belt 11 of the box conveyor BC and continue in a straight line to a position underneath the plunger P of the box registering device R. The plunger P forces a box B downwardly onto a wrapper W, Fig. 2, which has been previously coated with adhesive and fed by cooperation of the gluer G and the suction conveyor C to an assembly station directly beneath the plunger P. As hereinafter more fully described, the adhesive-coated wrapper W is moved into a position beneath the plunger P such that the center lines of the wrapper are precisely in alignment with the center lines of the box B to be assembled therewith. Thereafter the assemblies comprising an adhesive-coated wrapper in the flat and a set-up box registered thereon are moved step by step by the suction conveyor C to a transfer station opposite the box wrapping machine M. It will be noted that the movement of the boxes B, from the time they left the stayer S until the box and wrapper assemblies arrive at the transfer station opposite the box wrapping machine M, has been in a straight line path as viewed from above in Fig. 2.

The box machine M is of the type shown in U. S. Patents Nos. 2,074,561 and 2,144,338 and preferably includes the automatic transfer mechanism described and claimed in aforesaid Patent No. 2,705,905. The main cam 12 is attached to a vertical shaft 13 which is driven from a motor $m_1$, Fig. 8, through a clutch 14. As hereinafter more fully described, the operations of the stayer S, the gluer G and the suction conveyor C are synchronized with the operation of the box machine M by means of electromechanical connections. To initiate operation of the box wrapping system and specifically the machine M, a pedal 15, Fig. 1, is depressed causing the driving and driven elements of clutch 14 to be engaged to rotate shaft 13 through one revolution. At the end of one revolution of shaft 13, which corresponds with one cycle of the wrapping machine, the driving and driven elements in clutch 14 are adapted to be disengaged to interrupt operation of the machine, provided the pedal 15 does not remain depressed, in which event the cycle repeats. Inasmuch as the system is of the full automatic type, once the pedal 15 is depressed, it preferably remains in that position until the box run is completed or until it is desired to shut down the system.

During each cycle of the box wrapping machine M the main cam 12 makes one complete revolution and the form block F, Fig. 1, comprising an upper form and a lower form, is moved from the upper position shown in Fig. 1 downwardly in a path adjacent various sheet-applying tools and thence back to its original position shown in Fig. 1. During such movement, the bottom of the box is clamped between the lower form block and a platen, not shown. The movement of the form block F and relative movements with respect to each other of its components are effected by levers 16 and 17 having cam followers which ride in the cam grooves in the main cam 12. As is well understood in the art, the particular form block selected for a box run is dimensioned to suit the particular boxes to be wrapped by the machine.

The various sheet-applying tools, including side rolls, end rolls, marginal turn-in tools and presser blocks, are carried by four tool slides adjustably connected to table 18 of the machine M and each is provided with operating members connected by way of slidable sleeve 19 which in turn is controlled from a cam 20 on the lower end of the vertical shaft 13. During each cycle of the machine M, the sleeve 19 is reciprocated to effect the various sheet-applying operations of the tools, all as more fully shown and described in aforesaid Patent No. 2,074,561.

Referring to Figs. 1 and 2, the conveyor C is intermittently advanced, making one step for each cycle of the box wrapping machine M to transport adjacent the path of form block F the assemblies, each comprising a stayed box B to which is adhesively attached to the bottom panel thereof partially applied sheet material illustrated as a wrapper or label W. The conveyor C is of the suction type for holding the wrappers flat on the conveyor by suction, as in Stokes U. S. Patent No. 1,701,317 or in Davis U. S. Patent No. 1,818,198, and includes additional novel features which also form part of the present invention. The gluing machine G which delivers adhesive-coated wrappers to the conveyor C in manner similar to that shown in the aforesaid Stokes patent or Federwitz U. S. Patent No. 1,772,344 also includes novel features which form part of the present invention as hereinafter to be described more in detail.

Before discussing in detail the various novel features that cooperate and contribute to the improved operation of the present full automatic box wrapping system, there will first be described a general operation of the system. Referring to Figs. 1, 2 and 8, stayed boxes B are fed in succession from the box conveyor BC to box supporting structure 201 disposed beneath the plunger P of the registering device R. The boxes B are moved in succession against box stop means including a pair of spaced stop members 30 and 31 for aligning the set-up boxes B with the plunger P. The stop member 31, as hereinafter more fully described, preferably includes a suction port and a suction connection illustrated as a suction line 32 connected to a vacuum pump 33, the latter also supplying suction for feeding the wrappers W to the gluer G as hereinafter to be described. The vacuum pump 33 may be driven from any suitable means and is illustrated diagrammatically in Fig. 8 as being driven through a suitable chain and sprocket arrangement including chains 34 and 62 from a drive motor $m_2$ which, as later to be described, drives the gluer G and also the suction conveyor C and box conveyor BC.

When a box B arrives in position underneath the plunger P and against the stop members 30 and 31, the suction port in member 31 will be closed by the box, thus closing the suction line 32 with respect to atmosphere and thereby causing the diaphragm device 35, Fig. 8, which is connected to suction line 32, to withdraw a pivoted latch member 36 from its latching engagement with pivoted arm 37, the latter forming part of the operating mechanism for the plunger P in the registering device R.

To put the box wrapping system into operation, the pedal 15, Fig. 1, is depressed causing the one-time shaft 13 and its cylindrical cam 12 to be driven through a revolution from motor $m_1$ by way of clutch 14. Also carried on shaft 13 is a gluer trip cam 39, Fig. 8, which engages a cam follower 40 on the pivoted arm 41 which is interconnected with a shaft 42 in the gluer by way of cable 43 and arm 44 which is secured to shaft 42. The shaft 13 rotates in a clockwise direction, Fig. 8, causing the cable 43 to be moved in the direction of the arrow to rotate shaft 42 in a clockwise direction causing the link mechanism 50 connected thereto to release the latch mechanism 55 for rotation of shaft 61 which supports worm wheel 60, the latter normally being free on shaft 61. The shaft 61 is a one-time shaft and is driven from drive motor $m_2$ by way of chain 62, a sprocket on shaft 63, meshing gears 64 and 65, shaft 66 and worm 67, the latter meshing with and continuously driving worm wheel 60. At the end of one cycle, i. e. one revolution of shaft 61, if the latching mechanism 55 is in tripped position, as will be the case if pedal 15, Fig. 1, remains depressed to cause continuous rotation of shaft 13 in wrapping machine M, the shaft 61 will repeat its cycle as is the intended operation when the system is being operated continuously. At the opposite ends of shaft 61 is a cam 70 which rotates with the shaft and is adapted to engage a cam follower 71 on a pivoted arm 72 which in turn is connected by way of a link 73 and arm 74 to a shaft 75 at the opposite end of which is provided a tripping mechanism 80 for the registering device R. The tripping mechanism 80 includes a latch member 81 which normally engages a cooperating member 82 carried by the driven clutch member 83. Driving member 84 of the clutch is continuously driven from a suitable source of power such as a motor $m_3$ by way of a chain 86. Rotatable with driven clutch member 83 is a cam 87 which also is adapted to be driven through one revolution for each cycle. When latch member 81 is moved to released position with respect to member 82, cam 87 is rotated by motor $m_3$ and causes arm 89 to be pivoted by reason of the engagement between its cam follower 89a and the periphery of cam 87. Arm 89 is fixed on a shaft 90 at the opposite end of which is fixed another arm 37, the latter being connected by way of a link 92 and a bell crank 93 to one end of a tension spring 94, the opposite end of which is fixed to the frame of the registering device R. The spring 94 biases the cam follower 89a against cam 87 and also supplies the source of power for reciprocating plunger P through the mechanical connection including arm 95 and link 96. The arm 95 is pivoted by bell crank 93 through their common pivot 91.

It will be recalled that when box B arrived in position against the suction stop member 31, the latch member 36 was withdrawn from its latching position with respect to arm 37. Thus when cam 87 is rotated by motor $m_3$, the arm 37 may be pivoted to its upper or dotted line position as shown in Fig. 8 under the action of cam follower 89a moving over the rise on cam 87 and thus rotating arm 89, shaft 90 and arm 37. As the arm 37 moves upwardly, the spring 94 also rotates the bell crank 93 about its central pivot 91 and thus through arm 95 and link 96 moves the plunger P downwardly to move the box B from its supported position to a registered position on the adhesive-coated wrapper W. As cam 87 continues its rotation and completes its cycle, the plunger P is withdrawn from the box and the box stripped from the plunger as the latter moves upwardly to its original position as illustrated in Fig. 8, all as more fully described hereinafter.

It will also be noted that when arm 37 is in its dotted line position as shown in Fig. 8, the contacts of normally open microswitch 100 are closed thereby energizing the solenoid 101 in the timing relay 102. The timing relay 102 is preferably of the electropneumatic type permitting a time delay in opening its contacts 103, 104 after they are closed by the solenoid 101. The electrical power for solenoid 101 may be derived from suitable line connections $L_1$, $L_2$. When the contacts 103, 104 in the time delay relay 102 are closed, they in turn, by way of circuit connections 105 and 106, close a magnetic switch in the control panel, not shown, thereby starting the motor for the staying machine S and preferably releasing a brake on such motor, not shown. The stayer S also includes a one-time shaft 110 carrying a cam 111 which closes a normally open switch 112, thereby keeping the stayer motor running, after the contacts 103 and 104 of the time delay relay 102 have opened, until the cam 111 permits the switch 112 to open. When switch 112 is opened, the magnetic brake on the now-deenergized stayer motor causes the latter to stop and prevents the staying cycle from being repeated in part by the momentum of the deenergized motor.

Having described the general operation of the box wrapping system, more detailed reference will now be made to various components of the system and more particularly to the novel features thereof which contribute to the improved operation of the present full automatic box wrapping system.

The box conveyor includes novel features of the present invention. The box conveyor BC, Figs. 1 and 2, is shown on enlarged scale in Figs. 3 and 4. The box conveyor BC includes a main frame 150 supported at one end adjacent the staying machine S by a support member 151 and at its opposite end by a bracket 152, Fig. 1, carried by the frame of the gluer G. The belt 11 is of the endless type and passes along an arcuate path over rollers 153 and 154 disposed respectively at opposite ends of the conveyor. The upper run of the belt passes along an arc at the lower end of the conveyor and terminates in a substantially horizontal plane at the upper or discharge end. This construction provides small angular gaps between successive boxes and eliminates the large angular gap resulting from abrupt angular change in belt travel thus permitting the use of a top guide 180 to prevent piling up of the boxes. The belt 11 preferably is formed of a material having a high-friction outer surface such that the set-up boxes will readily be conveyed and moved along by it. An example of a belt having a suitable friction surface is one formed of a rubber covered fabric with the outer surface thereof being covered with many small projections closely spaced and extending outwardly from the outer surface of the belt. This type of belt has been found to be satisfactory in moving the boxes from the relatively low position from which they are discharged from the staying machine S upwardly to the relatively high position on the box supports 201, Figs. 1, 6 and 8, beneath the plunger P of the registering device R. As hereinafter described, the belt 11 is driven continuously and preferably from motor $m_2$, Fig. 8. The tension on the belt 11 may be adjusted by any suitable means such, for example, as by the roller 155 that is adapted to engage the inner surface of the belt 11 and is pivoted from opposite sides of the frame 150 by a pair of arms 156, 156. The position of the roller 155 with respect to the belt 11 may be adjusted by means of the threaded rod 157 that extends through an eyelet 158 carried by arm 156, the upper end of rod 157 being pivotally carried by frame 150. A pair of nuts 159 are adapted to be disposed one on each side of member 158 to lock the arm 156 and thus roller 155 in its desired position for applying the selected tension to belt 11. As may be seen in Figs. 3 and 4, the belt 11 also passes over rollers 160 and 161 that are supported on frame 150, thus holding the portion of the belt 11 extending therebetween in a position closely adjacent the underside of frame 150.

To aid in transferring the stayed boxes B from the conveyor belt 10 of the staying machine S to box conveyor belt 11, there is preferably provided a transfer means bridging the space between the conveyor belts 10 and 11, such transfer means having been illustrated in Figs. 3 and 4 as a transfer plate 165 also carried by the frame 150 of the box conveyor BC. In order to prevent the boxes B from becoming displaced from the conveyor BC as they are being moved along by the belt 11 to the station beneath the plunger P, the frame 150 of the box conveyor BC is provided with side guides 170, 170, one disposed on each side of the path along which the boxes travel. It is frequently necessary to wrap boxes of different sizes, and thus it is preferable that the side guides 170 be adjustable. For example, in one application of the present invention a box wrapping system was constructed for handling box sizes that ranged from a minimum of 4 inches by 2 inches by ½ inch to a maximum of 15 inches by 10 inches by 2¾ inches (score measure). Accordingly, as shown in Figs. 3 and 4, the side guides 170, 170 are provided with spaced rod members 171 projecting therefrom at spaced locations and in a direction away from the box path. Each of the rods 171 is adapted to be received by clamping means 172 of the duplex type which includes a clamping block having openings extending therethrough and perpendicular to each other with the horizontal opening being adapted to receive rod 171 and the vertical opening being adapted to receive rod 175, the lower end of which is secured to frame 150 by a bracket 176. The clamping blocks 172 are provided with threaded holes adjacent the rod openings respectively to receive cooperating threaded members illustrated as thumb screws 177 and 178. As may be seen in Figs. 3 and 4, the clamping blocks 172 are provided with slits extending through the rod openings as well as through the threaded openings for thumb screws 177 and 178. Thus when the thumb screws 177 and 178 are tightened, they will in turn cause the corresponding slit sections of blocks 172 to grip the corresponding rods 171 and 175. From the foregoing description it will be seen that the side guides 170, 170 by adjustment of thumb screws 177 may be adjusted upward or downward with respect to the conveyor belt 11 to provide the necessary guiding for boxes of different depths. Similarly, by adjusting thumb screws 178, the side guides 170, 170 may be moved to the proper location to accommodate boxes of different widths.

The conveyor belt 11 travels at a relatively high rate of speed in order to convey the boxes B to their upper position beneath the plunger P, and in order to prevent the boxes from piling up on top of each other as they are being fed along by the conveyor there is provided a top guide 180 that extends along the box path and over the belt 11. The top box guide 180 is carried by support members 181 which in turn are carried by posts 175. The supports 181 are secured to the posts 175 by adjustable means such as set screws 182. The top box guide 180 has secured thereto a substantially U-shaped block member 183 which is adapted to extend beneath the members 181. The U-shaped blocks 183 are each provided with a plate member 184 adapted to extend over the members 181 and secured to the ends of the block 183 as by spaced screw members 185. Thus, the top guide 180 for the boxes B may be raised or lowered with respect to belt 11 to accommodate boxes of different depths by adjusting the set screws 182 to raise or lower the position of the support members 181. It will be noted that some of the posts 175 extend at different angles from the frame 150 than others, and thus the U-shaped block members 183 permit the top box guide 180 to be adjusted lengthwise of the conveyor belt 11 during the up or down adjustment to compensate for the difference in angular disposition of post members 175. Inasmuch as there is relatively little danger of the boxes B piling on top of each other as they first leave the staying machine S and during their initial travel on the left-hand end of conveyor belt 11 as viewed in Figs. 1–4, the top box guide need not extend the full length of the box conveyor BC, and thus the first post 175 at the left-hand end of the box conveyor BC need not be provided with supporting structure for the top guide 180.

When the boxes B near the upper end of the box conveyor BC adjacent the registering device R, it is desirable that the sides of the boxes B be maintained in a substantially vertical position and that the sides be prevented from bowing. To this end the side guides 170 are provided with a separate section 170a which may be adjusted more closely to approximate the box width. The main section of the side guides 170 need not be adjusted to so closely approximate the box width as the main function of the side guides 170 is to prevent the boxes B from falling off of the conveyor belt 11, and this can be accomplished without too precise an adjustment. Furthermore, it is preferable that the side guides 170 not engage the sides of the boxes B too closely as they would increase the friction on the side walls of the boxes B and thus retard their movement upwardly along the path defined by the conveyor belt 11. To cooperate with the side guides 170a, the posts 175a at the corresponding end of the box conveyor BC are adapted to support thereabove roller structure illustrated in Figs. 3 and 4 as a pair of rollers 190 which are adapted to be carried by a rod 191 and supported on adjustable blocks 192 similar in construction to adjustable blocks 172. The rollers 190 are adjusted vertically on posts 175a so that their periphery will engage the upper edge of the box sides as the boxes pass thereunder. With this arrangement the side guides 170a engage the outer surfaces of the box sides to hold the sides substantially vertical as they pass under the rollers 190 under the action of belt 11. As the boxes pass under the rollers 190, the rollers are caused to rotate and thereby aid the belt 11 in driving the boxes across the box supporting structure 201 into the aligned position beneath the plunger P of the registering device R. By employing an anti-friction device such as the rollers 190, it is insured that the boxes B will be held in engagement with the high-friction surface of the belt 11 as they leave the end of the box conveyor, and thus there will be imparted to the boxes B a relatively high driving force which will insure that the boxes are moved to their proper position beneath plunger P.

While separate rollers 190 have been illustrated in Fig. 4, it is to be understood that a single continuous roller might be employed. In another modification it is proposed that ball bearing members may be utilized, one disposed on each side of the conveyor belt 11 to engage its respective edge of the box side in manner similar to the spaced rollers 190 shown in Fig. 4. It is also proposed that a second ball bearing member may be disposed on an axis at 90° with respect to the first ball bearing member to engage the outer surface of the respective side wall directly beneath the other ball bearing member. In this modification the ball bearing members that are adapted to engage the upper edges of the box sides may be supported on arms extending from rod 191 for pivotal movement about the axis of rod 191 above the conveyor belt 11.

The box supporting structure 201 also includes novel features of the present invention. Referring to Figs. 5–7, as the boxes are fed off of the box conveyor BC and underneath the anti-friction members 190, the boxes slide over a transfer plate 200 and onto a box support 201. The box support 201 is carried on a pair of spaced slide members 202 disposed on opposite sides of the box path. The members 202 are slidably supported in a yoke frame 203 and adjustably secured thereto as by bolts 204, Fig. 7. The yoke frame 203 is in turn supported on the side frames 205, 206 of the gluer G in manner hereinafter to be described.

Each of the slides 202 is provided with a V-shaped member 207 for guiding a box B into a position beneath the plunger P. The members 207 are adapted to be secured to block members 208 which in turn are secured to slides 202 by suitable means such as screws 209. Beneath the V-shaped box guides 207 and also secured to slides 202 are novel flexible box supporting means that also form part of the present invention. The flexible box supporting means, as illustrated in Figs. 5, 7 and 9, includes coil spring members 211, 211, one side of which projects into the box path beneath the guides 207. The opposite sides of springs 211, 211 are adapted to be held in engagement with cushioning means, illustrated as a strip of foam rubber 212, by means of a rod 213 that extends axially of the springs 211. As may be seen in Fig. 9, the rod 213 is not disposed coaxially of spring 211, but instead has its axis disposed to one side of the spring axis and normally engages the inner surface of coil spring 211. Each rubber strip 212, Fig. 9, is supported by an L-shaped angle member 214 carried beneath each of the box guides 207 by slides 202. At the ends of members 214 are blocks 215, Fig. 5, which are adapted to receive the corresponding ends of rod 213.

To locate the boxes B in their proper position of alignment with the plunger P, the box guides 207 are provided with box stops 30 and 31 which are adjustable lengthwise of the guides 207. As the boxes leave the box conveyor 11, they ride over the transfer plate 200, along the guides 207 and onto the box supporting springs 211 until they engage the stops 30 and 31. The succeeding boxes on the box conveyor assist in driving the first box over against the box stops. As shown in Fig. 5, box stop 31 is provided with a suction port 31a and a suction or vacuum connection in the form of a hose 32 which is connected to a suitable source of suction such as the vacuum pump 33, Fig. 8.

Before a box B arrives against the box stops 30 and 31, the suction port 31a will be open to atmosphere, thus causing a leak in the vacuum line, thereby preventing the diaphragm 35, Fig. 8, from operating to remove the latch 36 with respect to the operating mechanism for the plunger P in registering device R. Accordingly, until a box B arrives against the stops 30 and 31 and closes the port 31a, the plunger P cannot be reciprocated, and thus there is avoided the danger of its being brought into direct contact with an adhesive-coated wrapper which would necessitate shutting down the machine to remove the wrapper from the plunger P. When a box B does engage the box stops 30 and 31 and closes suction port 31a, the vacuum line 32 will be closed to atmosphere as manual valve V is normally in its closed position, and thus diaphragm 35 will operate to remove latch 36, thereby permitting actuation of plunger P in timed sequence with the other elements of the box wrapping system. In the event no wrappers are being fed by the gluer to the suction conveyor C, it is not desirable to have the plunger P continue to feed boxes down onto the conveyor C. In order to prevent the plunger P from feeding the boxes B, the valve V may be turned to opened position, thereby opening the vacuum line 32 to atmosphere, although port 31a is closed by a box, which will prevent the diaphragm 35 from operating to release the latch 36, and thus the plunger P will remain in its upper position as shown in Fig. 8.

The box plunger P comprises a rod 225 that is adapted to reciprocate vertically in the yoke frame 203, Fig. 7. At the lower end of rod 225 is a plunger form 226 preferably constructed from wood or other suitable material and having dimensions corresponding respectively to the length and width of the interior of the box B. As the plunger P moves downwardly, the form 226 is inserted into the interior of the box B, Fig. 5, and the coil springs 211 are adapted to be depressed along a length thereof corresponding to the length of the box B and to compress the sponge rubber strip 212, thus permitting the box B and the form 226 to pass between the coil springs 211 and down onto an adhesive-coated wrapper on the upper surface of the belt 230 of suction conveyor C. After the box B and the form 226 pass between the coil springs 211, the foam rubber strips 212 will cause the coil springs 211 to move back to their original positions as shown in Fig. 7. While the plunger P is in its lowermost position, the succeeding box B is prevented from moving toward the plunger P by a stop member 231 that is carried by form 226 and extends vertically thereabove, Figs. 5 and 6. After the plunger P moves toward its upper position and the form 226 again passes between the coil springs 211, the box stop 231 will be raised to a position above the top edges of the succeeding boxes, and thus the latter can be fed by belt 11 into position against the box stops 30 and 31 beneath plunger P preparatory to the initiation of another cycle of the box wrapping system.

In order to prevent the form 226 from raising the succeeding box B on its upward stroke, there is provided box hold-down means illustrated in Figs. 5 and 6 as a pair of shoe members 235 adjustably carried on vertical rods 236 by adjustable blocks 237, Fig. 6, on horizontally disposed rods 238 which in turn are carried by the yoke frame 203. The adjustable blocks 237 may be of construction similar to adjustable blocks 172, previously described, thus permitting both horizontal and vertical adjustment of shoe members 235 with respect to the upper edges of boxes B. The shoe members 235, in addition to serving as box hold-down means, also function to aid in guiding the boxes into position beneath the form 226 of the plunger P.

The form 226 preferably is provided with notches 226a at the end thereof adjacent the hold-down members 235 to permit the latter to extend partially under the form 226 as shown in Fig. 6, thus insuring that the edge of the succeeding box B will be engaged by the shoes 235. It will be understood that different sized forms 226 will be used with different sizes of boxes B, and the hold-down members 235 may be correspondingly adjusted to accommodate such different sizes of boxes.

After the boxes B have been moved down onto an adhesive-coated wrapper W on the suction conveyor C by the plunger P, it is necessary to withdraw the latter without lifting the boxes from the wrapper W. In order to insure that this result is accomplished, there are provided pivoted stripping means, each including a pivoted arm 250 mounted on a pivot 251 and supported from a clamp 252 which in turn is carried by an arm 253 depending from each of slides 202, Figs. 7 and 9. The stripping arm 250 is spring biased by spring 249 to its upper position as illustrated in dotted lines in Fig. 9, and when the box and plunger move downward to the lower position shown in Fig. 9, the stripping arm is pivoted downwardly to its position illustrated in full line. The form 226 is provided with vertical guide members 254 which are adapted to be engaged by the pivoted arms 250 and thus prevent the box B from moving upwardly off of wrapper W as the lower ends of the arms 250 are held in position over the edges of the box sides until the form 226 is removed from the interior of the box B. Referring to Figs. 9 and 10, as the plunger moves upwardly and thus removes the form 226 from within the box B, the end 250a of arm 250 rides against the vertical member 254 and prevents the box B from moving upwardly with the form 226 and off wrapper W. As soon as the vertical member 254 moves to a position beyond the end of arm 250, the latter is rotated upwardly under the bias of spring 249 to its initial position as shown in dotted line in Fig. 9 with projection 250b in engagement with member 252.

As may be seen in Fig. 5, the bottom edge of the form 226 is beveled at 226b to aid in entry and removal of the form with respect to box B. When boxes of shallow depth are being fed through the system, it is sometimes difficult to hold the boxes B on the form 226 during downward movement due to the shallow side walls. Accordingly, as shown in Fig. 5, in order to assist in holding the shallow boxes B on the form 226, there is provided a brush 260 carried by the box support and disposed therebeneath. Thus, as the plunger moves down with a shallow box on form 226, the bristles of the brush 260 will engage the outer surface of the side wall of the box and restrain the box from falling off the form 226 during its downward movement. It is not necessary to use a brush except upon shallow work as the walls on the deeper boxes will provide sufficient frictional engagement with the corresponding walls on the form 226 to prevent the boxes from falling off the form prior to deposit of the boxes on the wrappers.

As hereinafter described more in detail, the wrappers W are coated with adhesive and fed out of the gluer G onto the end of the wrapper conveyor C to an assembly station, such that the center lines of the wrapper W will be in alignment with and directly below the center lines of a box B disposed beneath plunger P and against the box stops 30 and 31. While novel features of the gluer G and suction conveyor C, hereinafter to be described, provide for feeding wrappers of different sizes to the assembly station such that the center lines of the wrapper, regardless of size, will always be positioned at the same location, it is sometimes necessary to make adjustments to compensate for improper preparation of the work. For example, sometimes the wrappers are cut with a dull knife or are slightly misaligned in the stack when the cutting operation is performed. When the box system is adjusted to handle work of a particular size, it is adjusted upon the assumption that the various components, that is, the box blanks and the wrappers, have been properly precut for that size. Thus when the work has been properly prepared before it is fed into the box wrapping system, no further adjustment of the alignment of the system is necessary. Sometimes, however, the work is not properly prepared, and thus it is desirable that provision be made whereby the system may be adjusted to enable the improperly prepared work to be used and preferably without shutting down the system in order that production time will not be lost.

Accordingly, the present invention makes provision for adjustment of the center lines of the plunger P both longitudinally and transversely of the alignment station on the wrapper conveyor C. For example, it will be noted that the yoke frame 203 is adjustably carried by the gluer side frames 205 and 206. As shown in Figs. 7 and 13, the lower ends of the yoke frame 203 each are provided with T-slots 265, and the top of each T-slot is adapted to receive a plate 266 which is secured to a corresponding one of the side frames 205, 206 of the gluer. Inserted in the bottom portion of the T-slots 265 are adjusting blocks 268 which are internally threaded and are carried by the threaded ends of rod 269 that extends from one side frame 206 of the gluer G through the main frame section 300 of the conveyor C and through the opposite side frame 205. The rod 269 is provided with a knob 270 at one end thereof and stop collars 269a disposed adjacent opposite sides of the conveyor frame section 300. The conveyor frame 300 provides a bearing for the rod 269 and the stop collars 269a, 269a prevent axial movement of the rod 269 when the knob 270 is rotated. Upon turning the knob one way or the other, both blocks 268 will be moved in corresponding directions simultaneously to adjust the corresponding ends of yoke frame 203 to one side or the other of conveyor C. Thus by rotating knob 270, Figs. 7 and 13, the longitudinal center line of plunger P, and more particularly of form 226, will be adjusted transversely of the conveyor C. The amount of transverse adjustment is limited by the difference between the width of the top portion of T-slot 265 and the width of plate 266 disposed therein.

To adjust the transverse center line of plunger P longitudinally of conveyor C, Fig. 6, the yoke frame 203 and its T-slots 265 are moved longitudinally of plates 266. This adjustment is accomplished by rotating wheels 273 which are threadedly carried by threaded members 271 and one end of which is connected to the yoke frame 203. The rotatable wheels 273 are disposed for rotation between spaced abutments 272, Fig. 6, which permit the wheels 273 to rotate but not to move longitudinally with respect to plates 266. As the abutments 272 are secured to plates 266, rotation of wheels 270 will cause the threaded members 271 to move longitudinally of conveyor C and, in turn, to move the corresponding ends of yoke frame 203 longitudinally of the conveyor C.

As pointed out above, the amount of adjustment of the plunger P that is made either longitudinally or transversely of the conveyor is relatively small, for example, usually in the order of ⅛ inch, as such adjustments are provided to compensate for slight errors made by operators in preparing the work. When the yoke has been adjusted to its desired position so that the center lines of the plunger P and the center lines of the wrapper W are in precise alignment with each other, the yoke is then locked in place on plates 266 to maintain said alignment as by the locking screws 275, one being provided on either side of the yoke frame 203.

Referring to Figs. 11 and 11A, there is shown a modification of the flexible box supporting structure shown in Figs. 5 and 9. The modification shown in Figs. 11 and 11A is particularly suited for boxes having relatively thick wall structure such, for example, as heavy pasteboard cigar boxes or cigar boxes formed from wood. As may be seen in Fig. 11, the box $B_1$ is supported on a plurality of spaced elements 280 which correspond to the spaced turns or elements making up the coil springs 211 in the modification shown in Figs. 5 and 9. The elements 280 are secured on rods 281, 281 disposed along each side of the box path beneath the plunger P. The rods 281 are in turn carried at each end by blocks 283 on the box guides 207, the latter being carried by the adjustable slides 202 on yoke frame 203. Thus the box supporting elements 280 may be adjusted relative to the box path to accommodate boxes of different widths in the same manner as such adjustment is accomplished in the modification described and illustrated in connection with Figs. 5 and 9. The elements 280 are held in their normal position as illustrated in Fig. 11 against the under side of guides 207 by means of a tension spring 284, the opposite ends of which are respectively secured to an arm 285 carried by member 283 and a pivotal arm 286 secured to the end of rod 281.

When a box is fed into position in the modification illustrated in Figs. 11 and 11A, it moves from the box conveyor and thence along the box guides 207 onto the supporting elements 280 and against the box stops 30 and 31 with the forward end wall of the box $B_1$ covering the suction port 31a. The elements 280 preferably are beveled at their forward end to aid the box in its movement against the stops 30 and 31. The stops 30 and 31 may be carried directly on the box guides 207 as shown in Fig. 5, and as shown in Fig. 11, they may be backed up by means of an adjusting screw 289 on separate blocks such as block 288. Block 288 is carried by supporting member 283.

It will be noted that box $B_1$ is of the type used for cigars and utilizes a flat panel for the lid. Thus the end walls of the box $B_1$ are higher than the side walls by an amount corresponding to the thickness of the top or lid. In the modification disclosed in Fig. 9 is will be recalled that the box walls were all of the same height and of relatively thin material. With that arrangement the stripping was accomplished by contacting the side walls at a location intermediate their ends as shown in Figs. 5 and 9. In boxes of the type $B_1$ shown in Figs. 11 and 11A, it is preferable that stripping be performed at the corners of the boxes. The box stripping devices are generally similar to those previously described in connection with Figs. 5 and 9. The stripping devices as shown in Figs. 11 and 11A comprise an adjustable clamp or supporting member 290 adapted to be secured to a post member 291, depending from longitudinally slotted support bar 282 carried on the under side of slide 202, in a predetermined location as by means of a locking screw 292 extending through support 290 and engaging post 291. The member 290 is provided with a pair of spaced arms 290a through which extend a pair of pins 294 and 295. The pivoted stripping members 296 are carried on pin 295 and are adapted to be biased to their full line position, as shown in Fig. 11A, by means of a spring 297, Fig. 11. The stripping members 296 have projections 296a adapted to engage the stop pin 294 under the bias of spring 297. As box B₁ is moved downwardly by plunger P, the bottom and sides of the box B₁ will in turn engage the strippers 296 pivoting them out of the path of the box until the box B₁ is deposited in its aligned position on a wrapper W at the assembly station as illustrated in Fig. 11A.

The supporting members 290 are adjusted on members 291 to permit the strippers 296 to pivot from the dotted line position shown in Fig. 11A back to the full line position when the box B₁ rests on the wrapper W with the lower end 296b of the strippers disposed closely above the corners of the box B₁. It is preferable that the strippers 296 be disposed as closely above the corners of the box B₁ as possible in order to prevent the box B₁ from following the plunger P on its upward stroke and thus lifting the box B₁ off of the wrapper W before the adhesive has sufficient time to secure the bottom of the box to the wrapper W. If the box were to move upwardly with the plunger and without the wrapper and thereafter stripped from the plunger, there would be no assurance that the box would fall on the wrapper in properly aligned position.

In the modification of Figs. 11 and 11A, the form of the plunger is notched at locations corresponding to the element 280 to clear the latter on the upward stroke of the plunger. When boxes of different width are being run through the system, the necessary adjustment of the box supports 280 and strippers 296 will be taken care of by adjustment of slides 202. As the strippers 296 are adapted to engage the box corners, they must be additionally adjusted for boxes of different length. This is accomplished by moving the supporting posts 291 lengthwise of the slots in each support bar 282. It is preferable to provide a stripper 296 for each corner of the box B₁; however, adequate stripping can be accomplished in most applications by utilizing two strippers disposed at diagonally opposite corners.

The telescoping nose on the wrapper conveyor C also represents one of the novel features of this invention. In suction conveyors for transporting wrappers from the gluer to a box wrapping machine, it sometimes becomes necessary to raise the end of the conveyor adjacent the gluer to provide access to the various rollers and associated mechanism in the gluer that are disposed beneath the conveyor and particularly when an obstruction arises in the wrapper feeding mechanism of the gluer such, for example, as when a wrapper sometimes becomes wrinkled and wedges in the feeding mechanism, thus preventing further feeding of wrappers. In semi-automatic box wrapping systems such as described in the aforesaid Lange et al. patent, provision has been made to raise the end of the wrapper conveyor as by pivoting the end of the conveyor upwardly and out of its normal position over the gluer. Such pivotal action can be performed in systems of the semi-automatic type as there is no obstructing mechanism disposed over the surface of the conveyor. However, in full automatic systems such as disclosed in the present application, the registering mechanism R is disposed over that end of the conveyor C and thus prevents any pivotal action of the conveyor. Accordingly, the present invention includes an arrangement whereby the nose of the conveyor may be telescoped and thus withdrawn from its normal position over the gluer mechanism, thereby permitting access to the latter.

Referring to Figs. 12, 15 and 16, the suction conveyor C for the wrappers includes a main frame section 300 having an auxiliary frame section 301 adjacent the nose of the conveyor. The sections 300 and 301 are normally in the latched position as shown in Fig. 12 with the conveyor belt 230 under tension and passing over a curved perforated steel plate 302 carried by section 301 and forming the nose end of the conveyor. A rod 303 is connected to the auxiliary frame section 301 as well as to arms 305, one on each side of the conveyor, which in turn are pivoted to the side frames 205 and 206 of the gluer G at 306. The arms 305 are of irregular configuration as may be seen in Figs. 12 and 15 and also carry conveyor idler roller 304 as well as an adjustable paper guide roller 308 which is adapted to aid in feeding wrappers against a glue-distributing roller 310, as later to be described in detail.

When it is desired to have access to the glue-distributing roller 310 and associated mechanism, the handle 311 is rotated clockwise as viewed in Fig. 12 to its position in Fig. 15, thus rotating the latching member 312 about its pivot 313 and out of its normal engagement with the stop 315 carried by plate 266 secured to the side frames 205, 206 of the gluer G. The latching member 312 is normally held in its latch position as shown in Fig. 12 under the biasing action of spring 314 which surrounds pivot 313 and has its opposite ends respectively engaging projection 312a on latch 312 and projection 317 on the arm 305 for roller 304. Until latch 312 is moved out of engagement with stop 315, the main operating handle 320 which is fixed to shaft 306 cannot be rotated to move the arm 305 about pivot 306 and relieve the tension on conveyor belt 230. Also fixed to shaft 306 is a latch member 322 that engages a second latch member 323 which in turn is pivoted at 324 and spring-biased for counterclockwise rotation by spring 325. When the operating handle 320 is rotated in a clockwise direction from its position illustrated in Fig. 12 to its position illustrated in Fig. 15, the stop element 322 carried by shaft 306 will be engaged by the nose of latch 323 in the manner illustrated in Fig. 15. It will be noted that the latch 323 has rotated in a clockwise direction about its pivot 324 to a position such that the operating handle 320 cannot be moved in reverse direction without first releasing latching element 323 with respect to element 322. This provides a safety feature in that it prevents the nose of the conveyor from falling back into its normal position and causing injury to a mechanic or operator should he accidentally push the operating handle 320.

It will be noted, Fig. 16, that the auxiliary frame section 301 and the main frame section 300 of the conveyor have cooperating surfaces 301a and 300a that are normally in engagement when the conveyor nose is in the position illustrated in Fig. 12. When the operating handle 320 is moved to the position shown in Fig. 15, the surface 301a is caused to ride up on cooperating surface 300a, thus causing the auxiliary or nose section 301 to telescope with respect to the main frame 300, thus exposing the working parts of the glue mechanism directly therebeneath. At this time the tension is released on the conveyor belt 230 and it may be moved to the right as viewed in Fig. 16 along with the rollers 304 and 308.

To return the conveyor nose to its original position as shown in Fig. 12, the latch 323 is manually released by the operator from latch member 322 and rotated about its pivot 324, thus permitting the main operating handle 320 to be rotated in a counterclockwise direction about its pivot 306, thereby permitting return of arms 305 to the position shown in Fig. 12. The spring 314 will bias the latching member 312 back into its position against stop 313 as illustrated in Fig. 12, thus locking the conveyor nose in its original position and again placing the conveyor belt 230 under tension ready for operation of the box wrapping system.

Figure 14:
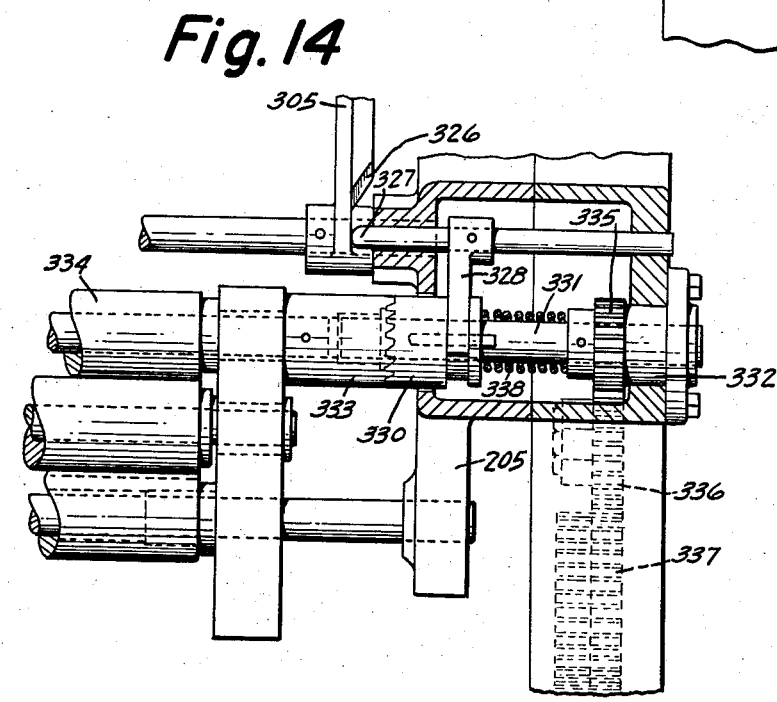
Fig. 14 is a fractional plan view of Fig. 12 taken along lines 14—14 in Fig. 13.

When arms 305 are rotated preparatory to telescoping the conveyor nose, the driving connection for the wrapper conveyor C is concurrently disconnected. This is accomplished by engagement of a cam surface 326 on the arm 305 at the back of the conveyor, Figs. 12 and 14, with the rounded end of pin 327 which carries a crescent member 328 adapted to ride in a groove at the rear of the driving member 330 of a toothed clutch, Fig. 14. The driving member 330 is keyed to a shaft 331, one end of which is journaled in a bearing 332 carried by the cover of the gluer on the side frame 205 disposed at the rear of the machine as viewed in Figs. 1 and 2. The other end of shaft 331 is journaled in a bearing in the driven member 333 of the toothed clutch, which member is fixed to the shaft of conveyor drive roll 334, Fig. 12. Adjacent bearing 332, Fig. 14, shaft 331 has secured thereto a gear 335 which meshes with idler gears 336 and 337 in the gear train connecting the conveyor drive to the source of power $M_2$, as hereinafter to be described. Also on shaft 331 and between the member 330 and the hub of gear 335 is a coil spring 338 that normally biases the driving member 330 into engagement with the driven member 333 of the toothed clutch. When the pin 327 is moved to the right as viewed in Fig. 14 upon engagement with cam surface 326 on arm 305, the crescent 328 causes the driving member 330 likewise to move to the right and to compress the coil spring 338, thus disengaging members 330 and 333 of the toothed clutch and disconnecting the drive for the conveyor. In this manner it is insured that conveyor drive roll 334 will not be driven while the conveyor is in its telescoped position and thus prevents possible damage to the conveyor belt 230.

As may be seen in Fig. 12, the conveyor belt passes under driving roll 334, over an intermediate roll 340 and under a third roll 341. To adjust the tension on the belt 230, the middle roller 340 is supported at its ends by means of bearing blocks 342 which are adapted to be either raised or lowered as desired by means of the upper and lower adjusting screws 343 and 344 respectively. The drive for rolls 340 and 341 is derived from their respective gears 345 and 346, Fig. 12, the latter meshing with the gear 347 on the opposite end of drive roll 334 from its main driving gear 335, Fig. 14.

Figure 17:
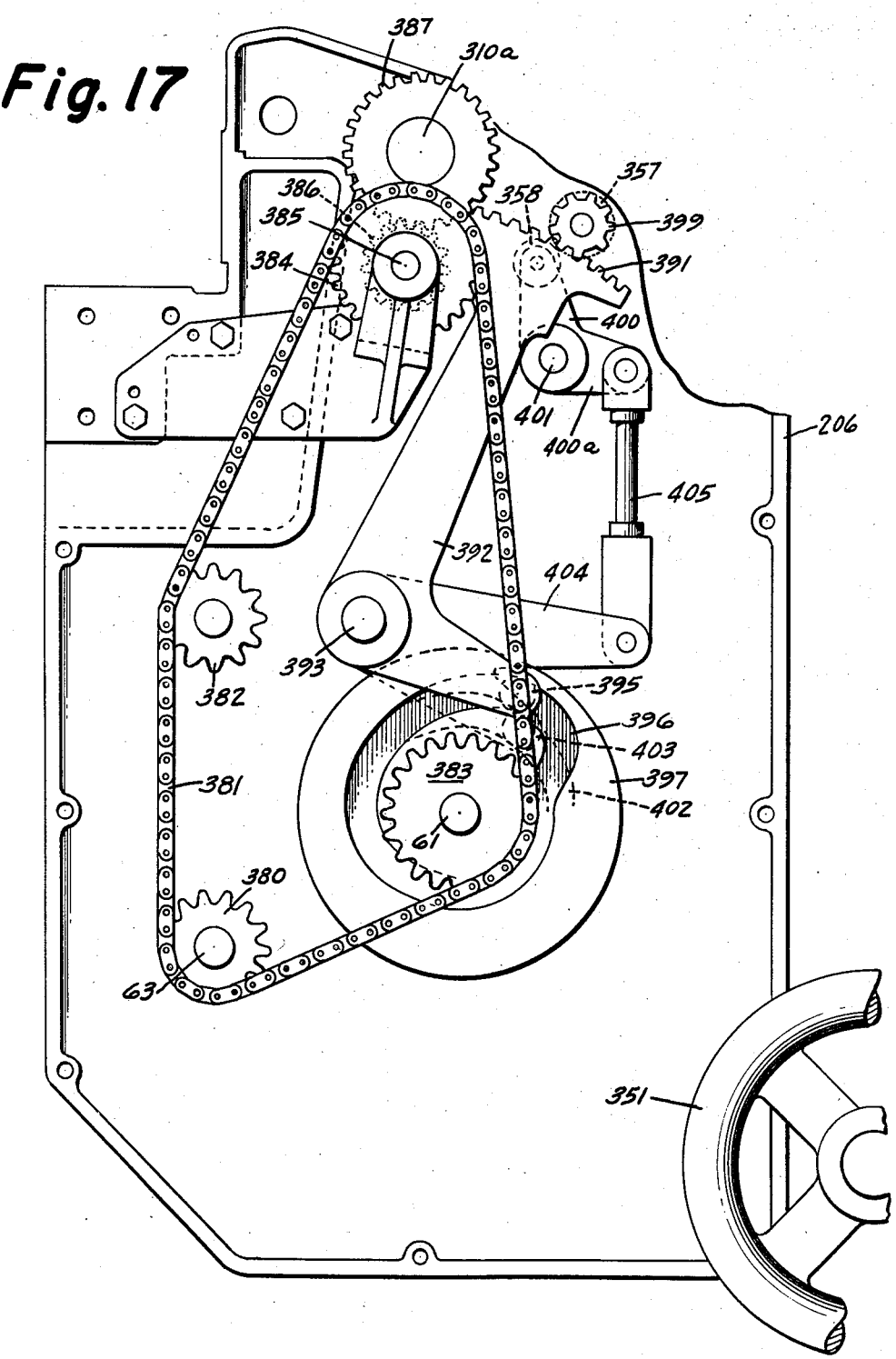
Fig. 17 is a view of the gear mechanism taken from the front of the machine as viewed in Figs. 1 and 2 for continuous driving of the glue roll and the reversing label feed roll drive.

In the gluer G there is provided mechanism for feeding wrappers or labels W from a supply stack, coating them with adhesive on one side thereof and delivering them in predetermined timed relation to an assembly station beneath the plunger P of registering device R with the center lines of the wrappers W in precise alignment with the center lines of the plunger P. This will assure that the plunger will register a box B on the adhesive-coated surface of the wrapper W so that both the center lines of the wrapper and the center lines of the box B will be in alignment. As shown in Fig. 2, the gluer G preferably is provided with two wrapper supply tables 350, 350, as disclosed in Patent No. 1,770,483 so that one table may be supplying wrappers to the system while the other table is being loaded with a new supply of wrappers by an operator. This avoids any prolonged shutdown of the system while a new supply of wrappers is being placed in the gluer. It is, of course, understood that the tables 350, 350 are preferably of the type that are raised during the feeding of the wrappers as the supply diminishes in order to compensate for the decreasing height in the supply stack. This feature is well known in the art, an example of which is described in Stokes et al. Patent No. 2,018,237. The hand wheel 351 shown in Figs. 1, 2 and 17 is also employed in raising the wrapper stack to its proper level in the gluer.

Referring to Figs. 12 and 12A, the wrappers W are fed from the supply stack on one of tables 350, 350 by means of a suction head 355 which may be of the type illustrated in Bailey Patent No. 2,276,683 with suction being supplied thereto by way of line 356 which is connected to the vacuum pump 33, Fig. 8. The vacuum pump 33 is illustrated as of the double cylinder type, one cylinder supplying the suction for line 32 and the other cylinder supplying suction for the line 356 connected to the label feed suction head 355. The exhaust from one side of the vacuum pump 33 is preferably directed against the edges of the wrappers in the stack in order to assist in separating one sheet from another and to aid in forcing the top sheet against the suction head 355. The exhaust from the other side of the pump preferably is directed against the nose of the conveyor to aid the suction in the conveyor in pulling the wrapper against the conveyor belt 230. The exhaust stream thus assists obtaining the precise accuracy of label feed that is required in a full automatic box wrapping system. The top wrapper on the stack is picked up by the suction head 355 with the aid of the exhaust air blast and is fed between a label feed roll 357 and a cooperating roller 358 and then between a pair of guide plates 359 and 360 which guide the wrapper between rolls 308 and 363. Before release of the wrapper W from the suction head 355, feed roll 358 is swung to its full line position shown in Fig. 12 to clamp the forward end of the wrapper between the two feed rolls 358 and 357.

It is important in full automatic box wrapping systems that the travel of the wrapper be controlled with a high degree of accuracy throughout its travel in the glue machine. Various provisions have been made in prior art systems to control the wrapper travel, and while they have been satisfactory for the most part, they have been subject to certain disadvantages even though they have made provision for keeping the wrapper under positive control during its passage through the gluer. As the wrapper passes from the supply stack to the glue applying roll 310, it will be noted that the path of the wrapper must turn sharply when it engages the glue roll 310 in order that the wrapper may be fed upwardly at that point and have adhesive applied to its outer surface. In prior art gluers such as in aforesaid Patent 2,276,683, care has been taken to have the wrapper under positive control as it is fed against the gluing roll. However, such systems have not provided for positive control of the leading end of the wrapper just prior to its engagement with the adhesive applying roll. As the path of travel of the wrapper abruptly changes at such location, the ends of the wrapper have sometimes become buckled due to this change of direction and thus even though the rear end of the wrapper is not released, nevertheless there has been a change in the rate of movement of the wrapper through the gluer due to the fact that the forward end was buckled and thus temporarily interrupted its forward movement or slowed down its forward movement so that it proceeded at a slower rate than the rear end of the wrapper.

In order to overcome this possibility for change in the feed of the wrappers, the present invention provides a roller 308 adjacent and driven from the glue applying roller 310 at the location of the change in direction of the label feed path so that the driven roller 308, in cooperation with roller 363 which extends through openings in lower guide plate 359 and is biased against the roll 308 by a spring 367, will maintain the leading end of the wrapper under positive control during its change in direction of movement through the gluer. Roll 363 is carried at its ends by pivoted arms 364 which are supported on rod 365 which also carries spring 367. The arms 364 and roll 363 may be pivoted in a counterclockwise direction by handle 366 to permit inspection and cleaning of roll 363.

The glue applying roller 310 cooperates with a scraper member or roll 370, preferably an intermittently operated doctor roll, to define a valley therebetween into which adhesive is discharged from a pipe, all as fully described and claimed in Bailey Patent No. 2,402,272. In order to prevent excessive adhesive from building up between rollers 370 and 365, a dam member 371 is provided that extends lengthwise of roll 365 and is carried by a support 372. To transfer the adhesive-coated wrappers to the conveyor, there are provided stripper blades 373 to deflect the wrappers W onto the belt 302 of suction conveyor C. The stripper blades 373 are assisted in their operation by the aforementioned air blast directed against the nose of the suction conveyor belt.

The drive for the glue-distributing roll 310 carried on shaft 310a and the label feed roll 357 is more clearly illustrated in Fig. 17. It will be recalled that shaft 63, Fig. 8, is driven from gluer motor $m_2$ by way of chain 62. The driven shaft 63 is provided with a sprocket 380 fixed thereto and adapted to drive a chain 381 which also passes over idler sprockets 382 and 383 and over a sprocket 384 carried on a stub shaft 385 which in turn carries a pinion 386 for meshing with and driving the gear 387 fixed to the shaft 310a of glue-distributing roller 310. The paper guide roll 308, Figs. 12 and 16, is also provided with a gear 390, Fig. 16, that is adapted to be driven from gear 387 on the glue distributing roll shaft 310a. The drive for the label feed roll 357 is accomplished by means of a segment gear 391 carried by an arm of crank 392, Fig. 17, which is pivoted at 393. The crank 392 has a second arm provided with a cam follower 395 which is adapted to follow a groove 396 in the front surface of a face cam 397, the latter also being fixed to the one-time shaft 61 of the gluer. The groove 396 in face cam 397 is so shaped to rotate arm 392 first in one direction and then in the other through an arc corresponding to the length of segment gear 391. The segment gear 391 in turn drives the pinion 399 on the shaft of label feed roll 357. While the rotation of the feed roll 357 will be alternately reversing to rotate first in one direction and then in the other, the suction head 355 only feeds wrappers to the label feed roll 357 when it is rotating in a clockwise direction as viewed in Figs. 12 and 12A. The roller 357 continues to rotate in a clockwise direction while it is in engagement with the wrapper and does not reverse its rotation until after the wrapper has passed between rollers 357 and 358 on its way to the belt 230 of suction conveyor C. It is at this time that the roller 357 rotates in reverse or counterclockwise direction preparatory to reversing its direction again to a clockwise rotation to pick up another wrapper and feed it to the glue distributing roll 310 and thence to the conveyor belt 230.

When a wrapper is fed by suction member 355 to the rolls 357 and 358, the roll 358 is spaced therefrom and both rolls are at rest. When the wrapper is between rolls 357 and 358, the latter roll is pivoted toward roll 357 by supporting bell cranks 400, one disposed at each end of the roll 358 on corresponding studs 401, Fig. 17, carried by side frames 205 and 206. This is accomplished by means of the groove 402 in the rear face of face cam 397 that is adapted to receive a cam follower 403 carried by a bell crank 404 pivoted at 393 and one arm of bell crank 404 being connected by way of a link 405 to arm 400a of bell crank 400. The groove 402 in the face cam 397 is shaped to rotate the bell crank 400 and roll 358 in a counterclockwise direction, as shown in Fig. 17, to separate roll 358 with respect to roll 357 while a wrapper is being inserted therebetween and thereafter to rotate bell crank 400 in a clockwise direction to move roll 358 against the wrapper and to hold the latter between rolls 358 and 357. At this time both rolls 357 and 358 are stationary and immediately thereafter rotation is imparted to roll 357 through its gear 399 meshing with segment gear 391 and roll 358 is rotated by reason of its engagement with roll 357. During this portion of the cycle the wrapper is fed by rolls 357 and 358 between guide plates 359 and 360, thence between rolls 363 and 308 to adhesive applying roll 310.

The foregoing drive for the label feed mechanism is separated from the drive for the suction conveyor belt 230 as later to be described. In prior art full automatic systems, the drive for the conveyor drive roll was derived from a toothed clutch operated from the one-time shaft of the gluer. The accuracy of such driving arrangements was limited by the pitch of the teeth on the toothed clutch. In order to obtain a precise conveyor travel and thus proper alignment of the wrappers at the registering station, it was necessary to utilize additional re-registering devices at or adjacent the registering station. Examples of such re-registering devices are illustrated in Patents 2,018,237 and 2,102,033. The present invention eliminates the need for such re-registering devices by providing an intermittent conveyor roll drive utilizing mutilated gears and separated from the label feed drive. By separating the conveyor roll drive from the label feed drive, there will not be transmitted to the latter any harmful effects of the shock inherent in a mutilated gear drive, and thus it is assured that the wrappers will be fed in a precisely controlled manner throughout their travel from the wrapper stack to the registering station.

Figure 18:
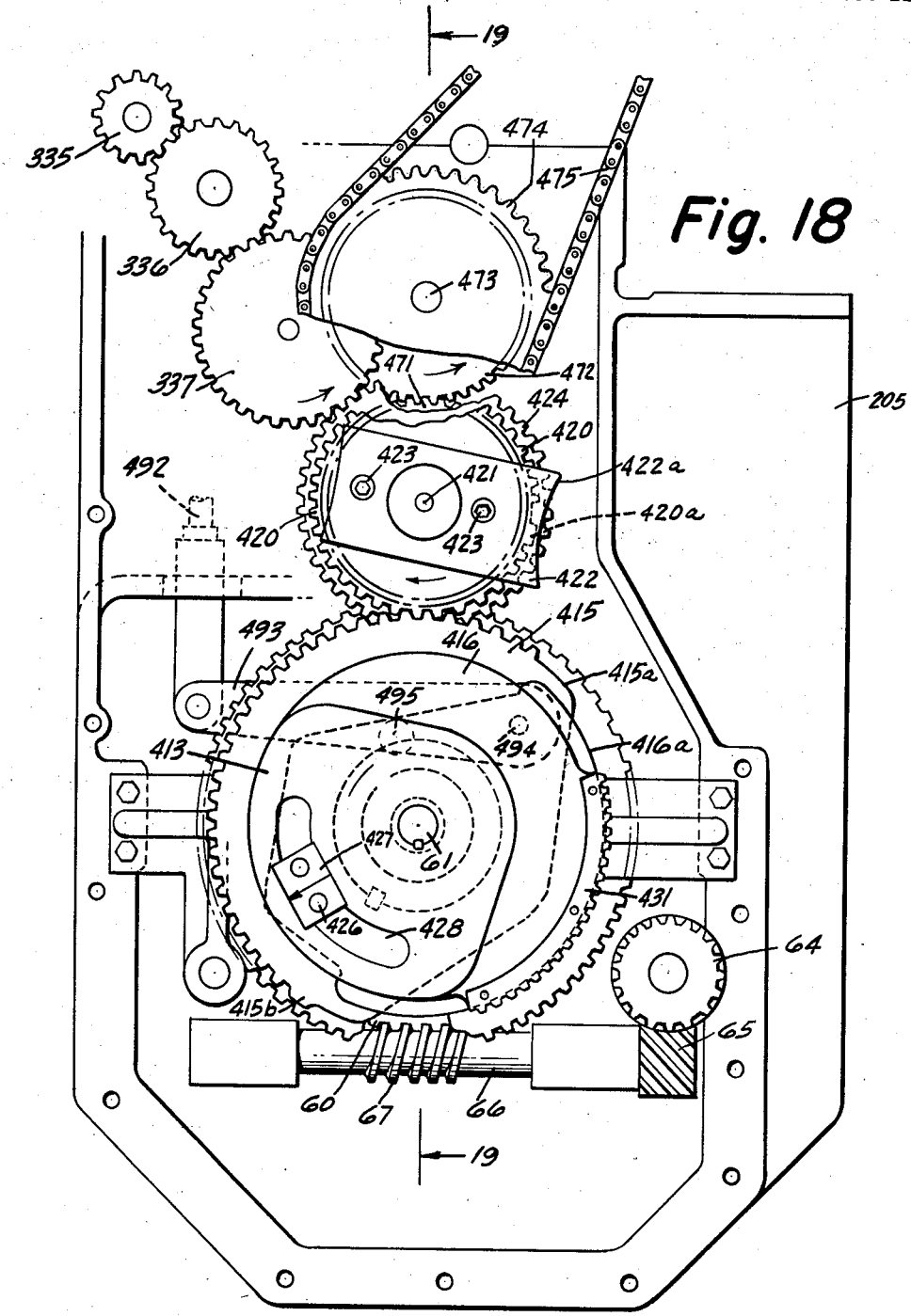
Fig. 18 is a view of the gear mechanism taken from the rear of the machine showing the intermittent drive of the suction conveyor and the continuous drive for the box conveyor.
Figure 19:
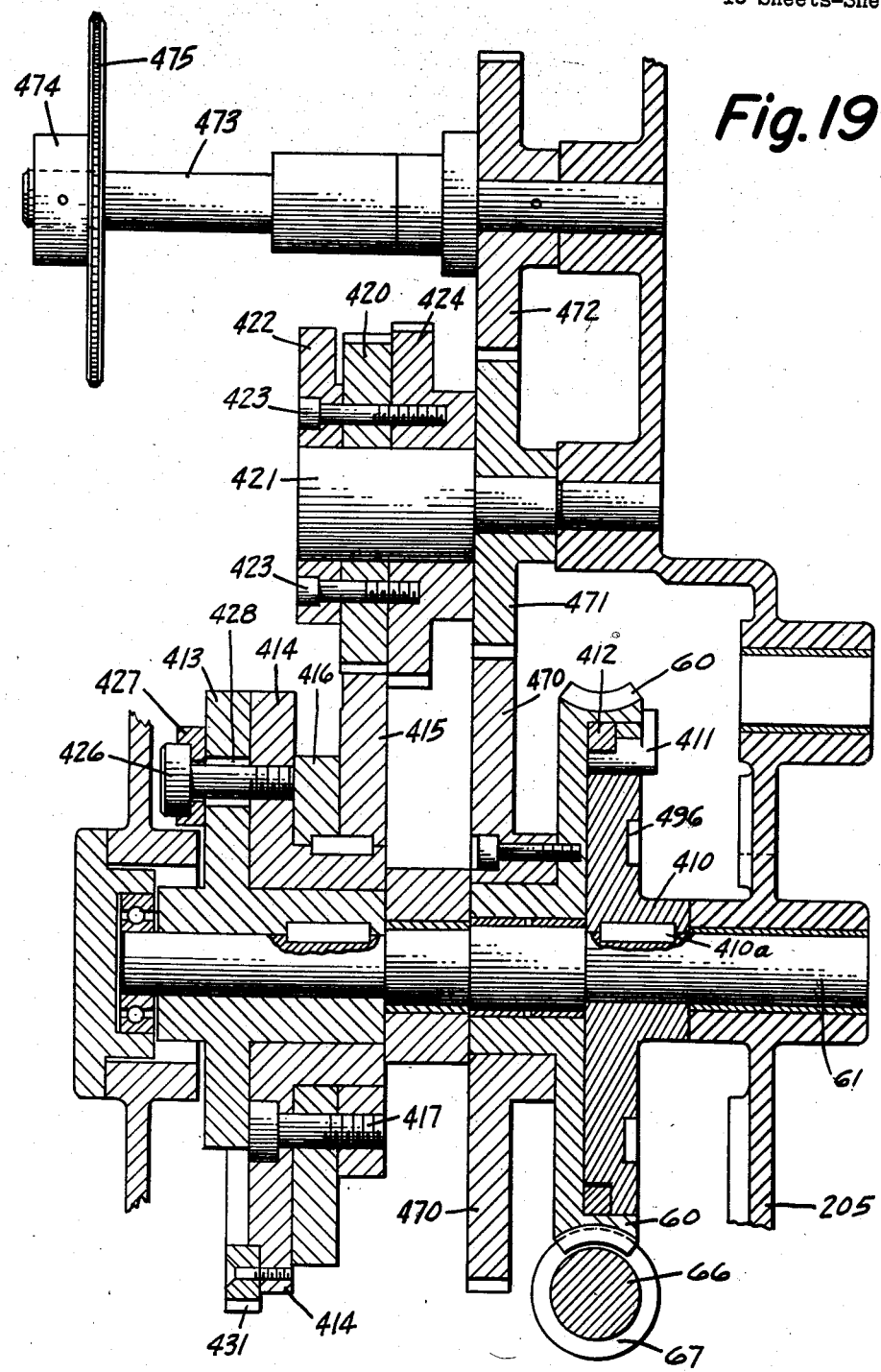
Fig. 19 is a sectional view taken along the lines 19—19 in Fig. 18.

It will be recalled from Fig. 8 that the one-time shaft 61 is driven from motor $m_2$ of the gluer by way of chain 62, shaft 63, gears 64 and 65, shaft 66 and worm 67 which continuously drives worm wheel 60. The worm wheel 60 is locked to shaft 61 when mechanism 55 is tripped by latch mechanism 50, the latter being actuated through cable 43 leading to the gluer trip cam 39 carried by the one-time shaft 13 in the wrapping machine. Referring to Fig. 19, the one-time shaft 61 of the gluer has keyed thereto at 410a a suction head operating cam 410 which carries therewith a driving pawl 411 normally in disengagement with a toothed ring 412 secured to worm wheel 60. Also keyed to shaft 61 is a disc member 413 on the hub of which is disposed a second disc member 414 to which is keyed an intermittent gear 415 and an intermittent disc 416, Fig. 18. The intermittent gear 415 is a mutilated gear, i. e. having a section thereof devoid of teeth. The intermittent gear 415 and intermittent disc 416 are also locked together for concurrent rotation with disc 413 as by bolts 417. The intermittent gear 415 drives intermittent pinion 420 which meshes therewith and is carried on a stub shaft 421. Pinion 420 is locked to an intermittent locking cam 422 and to a suction conveyor roll drive gear 424 all on shaft 421 by a pair of locking screws 423. The unit comprising members 420, 422 and 424 rotates freely on shaft 421. The suction conveyor roll drive gear 424 meshes with gear 337, Figs. 13 and 18, which is a double width gear as shown in Fig. 13, the latter meshing with gear 336 which in turn meshes with gear 335 on the drive roll 334 of the suction conveyor belt 230.

As previously mentioned, the suction conveyor C is intermittently operated in timed relation with the cycle of the box wrapping machine. Referring to Figs. 18 and 19, the intermittent operation is provided in the following manner. The one-time shaft 61 is the driving shaft and carries the mutilated gear 415 which has a peripheral portion 415a thereof devoid of teeth as shown in Fig. 18. The intermittent disc 416 is fixed to the hub of disc 414 and rotates with the intermittent gear 415. The intermittent disc 416 has a surface 416a of uniform diameter adapted to be engaged by the cooperating arcuate surface 422a on the locking cam 422. In angular extent the cam surface 416a of intermittent disc 416 corresponds with the toothless portion of the driving or mutilated gear 415. The pinion 420 that meshes with the intermittent gear 415 is a full toothed pinion having at the starting portion a double tooth 420a for engaging a similar double tooth 415b on gear 415 to withstand the force resulting when the gear 415 first engages the pinion 420 in a cycle. The locking cam 422 which rotates with pinion 420 is adapted to engage the surface 416a of locking disc 416 to lock the driven pinion 420 against rotation during a predetermined portion of each revolution of the driving or mutilated gear 415 corresponding to the toothless portion 415a of the gear 415 so to provide a dwell of the conveyor belt 230 after the wrapper has been delivered to the registering station. Upon completion of the dwell interval of the cycle, the teeth of the driving gear 415 will engage the teeth of the driven pinion 420 concurrently with disc 416 releasing the locking cam 422 so as to permit advancement of the conveyor belt 230 and delivery of another wrapper to the registering station.

Figure 22:
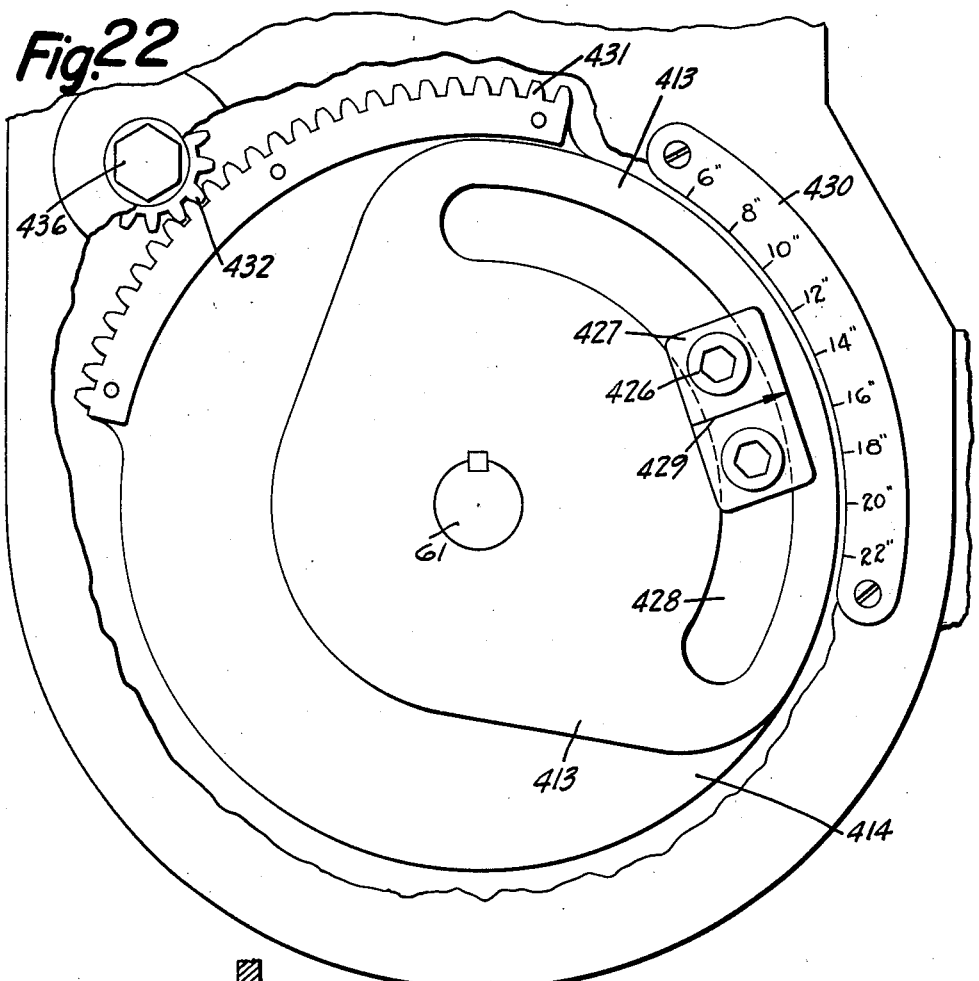
Fig. 22 is an elevational view of the label feeding adjustment with part of the cover broken away.
Figure 23:
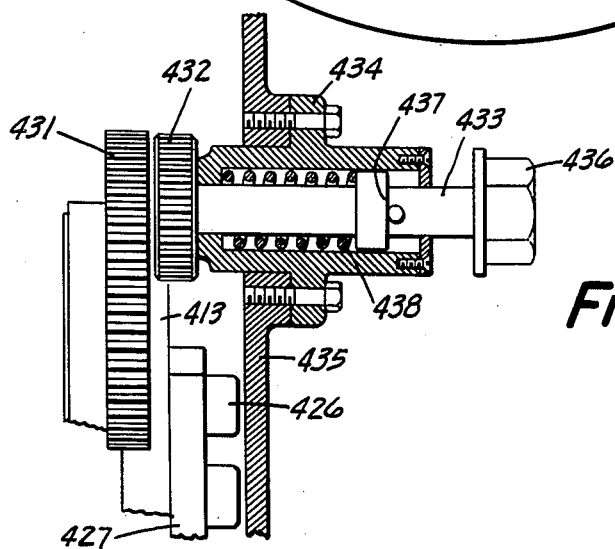
Fig. 23 is a sectional view along lines 23—23 in Fig. 22.

It will be recalled that the present system is adapted to wrap boxes of a wide range of sizes, and thus provision has been made for adjusting the starting and stopping of the conveyor belt 230 within each cycle of the gluer. To this end, adjustment may be made so that the double starting teeth on gears 415 and 420 will engage at different times in the gluer cycle corresponding to different lengths of wrappers. This adjustment is provided through the unit including members 414, 416 and 415 being rotatable on the hub of disc 413. The bolts 426 extend through a block 427 and a slot 428 in clamping disc 413. The ends of the bolts 426 are threaded into disc 414, and thus the unit including members 414, 416 and 415 is clamped in a predetermined position with respect to one-time shaft 61 by way of clamping disc 413 which, as previously described, is keyed to the shaft 61. As shown in Fig 22, the block 427 is provided with an indicating means such as arrow 429, the end of which is adapted to cooperate with a scale on plate 430, the latter being marked to correspond with different lengths of wrappers. The plate 430 has been marked for wrappers varying in length from 6 to 22 inches, by way of example. To adjust the one-time shaft 61 with respect to the unit comprising members 414, 416 and 415, the disc 414 is provided with a segment gear 431 secured thereto and adapted to be engaged by a gear 432, Fig. 23, carried by a shaft 433 journaled in a bearing 434 carried on side frame cover 435. The shaft 433 opposite the end from gear 432 is provided with a nut 436 which is fixed to shaft 433. Intermediate the ends of shaft 433 is a shoulder 437 which is adapted to be engaged by a coil spring 438, the other end of which is adapted to engage the counterbore of bearing 434 adjacent gear 432. The spring 438 normally holds gear 432 out of engagement with respect to segment 431. To adjust the one-time shaft 61 of the gluer for a wrapper of different size, the bolts 426, Figs. 18 and 19, are loosened, and thus the unit comprising members 414, 416 and 415 may be rotated with respect to the clamping disc 413. The aforesaid unit is rotated by compressing spring 438, Fig. 23, to bring gear 432 into driving engagement with segment 431 as by a wrench applied to nut 436 to rotate shaft 433, gear 432 and segment 431 to bring the arrow 429 opposite the marking on scale 430 that corresponds to the selected length of wrapper. Thereafter the locking bolts 426 are tightened to again clamp the locking disc 413 to the unit comprising members 414, 416 and 415 and thus lock said unit to the one-time shaft 61 in its new location.

By reason of the aforedescribed intermittent gear drive, the advancement of the wrapper may be precisely controlled so that the center lines of the wrapper, regardless of size, will always be brought to the same point at the assembly station on conveyor 230 with the center lines of the wrapper directly below and in alignment with the center lines of the plunger form 226. This accurate control has not been attainable heretofore without utilizing the aforementioned re-registering device, and thus the present invention provides for a more precise operation of the system and with simplified construction. It will be noted that the novel intermittent gear drive provides for infinite adjustment to accommodate labels of any length within the entire range of sizes to be handled by the system and is not limited to fixed steps of engagement as inherent in prior art systems utilizing toothed clutch mechanisms or the like. While friction clutches are not limited to fixed steps of engagement, they are subject to inaccuracy in wrapper feed through slippage.

Since the transverse center lines of all wrappers, regardless of size, are brought to the same location at the assembly station, it will be seen that the large wrappers must travel a greater distance than the smaller wrappers. It is for this reason that the intermittent gear mechanism is adjusted relative to the one-time shaft 61 in order that the conveyor belt 230 may start earlier in the cycle to move the short wrappers into their correct position than would be necessary when moving the long wrappers.

This prevents the short wrappers from being moved beyond the registering station as would be the case if both the long and short wrappers were picked up at the same time in the cycle.

Figure 20:
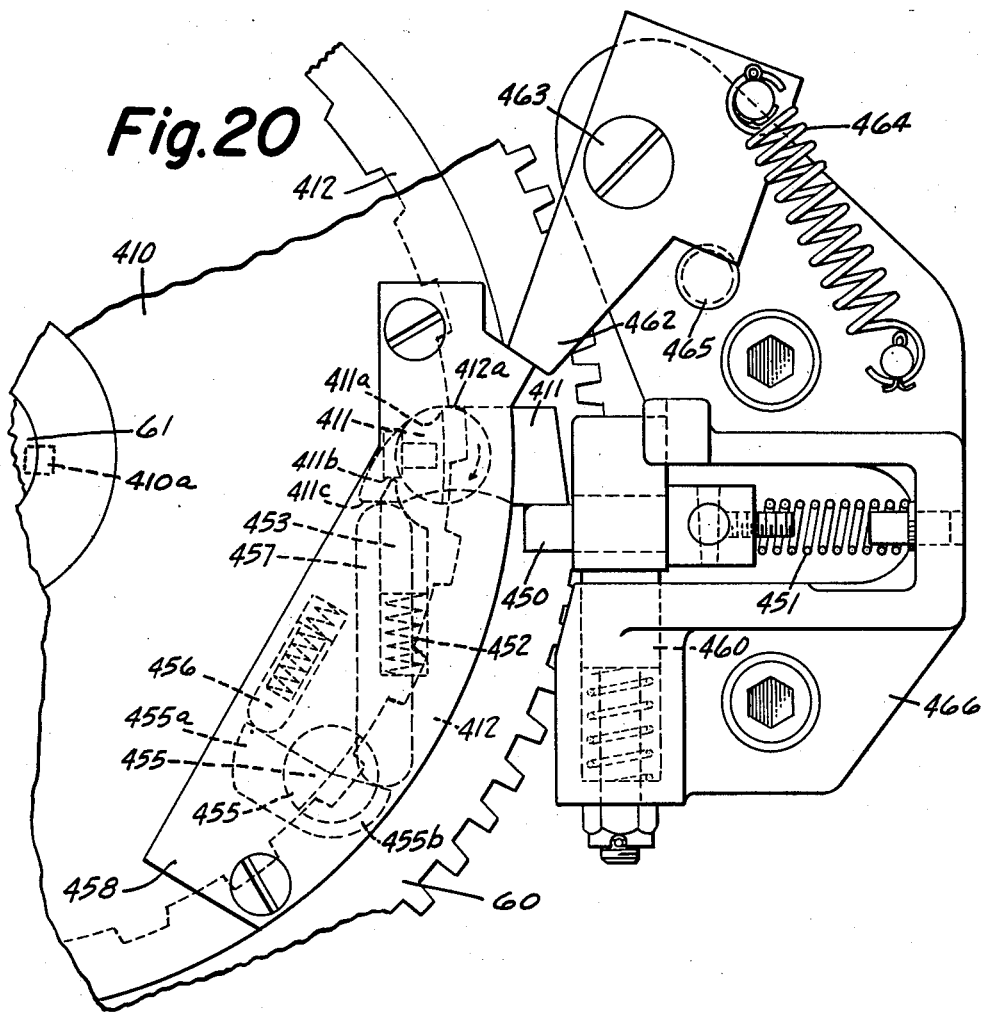
Fig. 20 shows the tripping assembly for the one-time shaft in the gluer.
Figure 21:
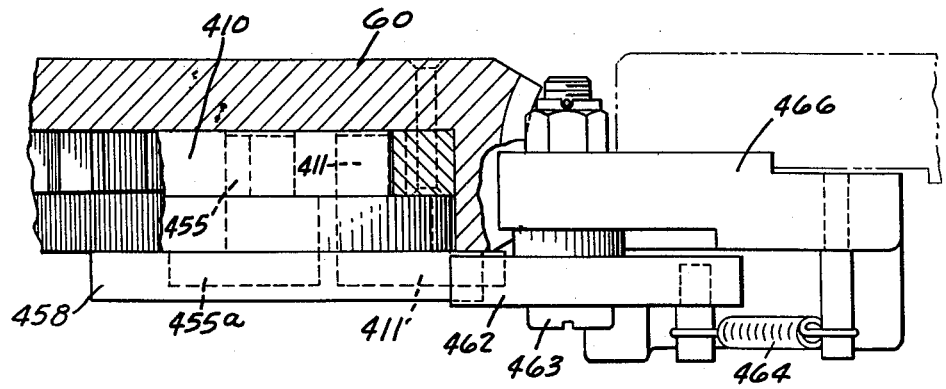
Fig. 21 is a plan view of Fig. 20.

The driving pawl clutch mechanism shown in Figs. 20 and 21 is a detailed showing of the pawl and latch mechanisms 55 and 81, 82, illustrated diagrammatically in Fig. 8. However, it will now be described in connection with the worm wheel 60 and one-time shaft 61. As shown in Figs. 20 and 21, the one-time shaft 61 has keyed thereto a cam 410 carrying driving pawl 411 which is normally disengaged with respect to the toothed ring 412. When latch 450 is withdrawn by linkage 50, Fig. 8, thereby compressing coil spring 451, Fig. 20, the driving pawl 411 is rotated in a clockwise direction by spring 452 biasing plunger 453 against pawl projection 411b for rotation of shaft 61 with worm wheel 60, Fig. 20, to bring the driving pawl corner 411a into engagement with an adjacent tooth 412a of toothed ring 412. To insure that the pawl 411 will be locked with respect to toothed ring 412, there is provided a locking pawl 455 of generally similar construction to driving pawl 411 with an end 455a adapted to be engaged by a spring biased plunger 456 for holding the locking pawl 455 in engagement with a corresponding tooth on toothed ring 412. The locking pawl 455 is actuated concurrently with the driving pawl 411 by means of the connecting member 457 which engages projection 411c on driving pawl 411 and projection 455b of locking pawl 455. The pawl mechanisms are held in place on the cam 410 by means of cover plate 458 secured thereto. When the one-time shaft 61 completes its revolution, the pawl 411 will engage the latch 450 to stop rotation of shaft 61. In order to absorb the impact of the one-time shaft 61 and its associated mechanism, a spring biased plunger 460 is provided with an opening therethrough to receive the latch member 450. To cooperate with the latch 450 in preventing reverse rotation of shaft 61, there is provided an additional latch 462 pivoted at 463 and biased by a tension spring 464 against a stop 465 carried by a bracket 466 on the side frame of the gluer. The lower end of latch 462 is adapted to engage a stop on cover plate 458 of the pawl mechanism.

The drive for the box conveyor BC is continuous and as may be seen in Figs. 18 and 19, the drive is from worm 60 having fixed thereto a gear 470 which meshes with gear 471 which in turn meshes with gear 472, the latter being fixed to a shaft 473 which at one end thereof has fixed thereto a sprocket 474, Fig. 19, around which passes a chain 475 which also passes over a sprocket 476, Fig. 12, fixed to shaft of the box conveyor drive roll 154, Figs. 3 and 12.

The drive for the suction head 355 is illustrated in Figs. 12A and 18. The suction head 355 is carried by spaced arms 490 pivoted on corresponding stub shafts 491 carried by the side frames 205 and 206 of the gluer. One of arms 490 is connected by way of a connecting link 492 to an arm 493 pivoted at 494 on side frame 205. The arm 493 carries a cam follower 495 which is adapted to ride in a groove 496 in face cam 410 keyed to one-time shaft 61, Fig. 19. The cam groove 496 is shaped to cause suction head 355 to be rotated during each cycle from a lower position where it inserts the forward edge of the wrapper between the wrapper feed rolls 357 and 358 as previously described. The link 492 extends through a hole in arm 490 and a nut is attached to the upper end of link 492. A coil spring is disposed around the upper end of link 492 and between the arm 490 and a collar 492a to prevent overtravel of the suction head 355 by the link 492.

The mechanism for operating plunger P shown diagrammatically in Fig. 8, is shown more in detail in Figs.

24 and 25. The motor $m_3$, Figs. 8 and 24, is provided with a pulley 500 around which passes a belt 86 which drives a pulley wheel 84 fixed to shaft 501. As may be seen in Fig. 25, keyed to shaft 501 is a disc 83 which carries a toothed ring 503 adapted to be engaged by a driving pawl 82, the latter being carried by a disc 504 which is secured to a hub member 505 and a cam 87 by means of a pair of through bolts 507. The unit comprising members 504, 505 and 87 rotates freely on shaft 501. The driving pawl 82 is identical in construction to the driving pawl 411, previously described, and operates in a similar fashion. When the latch 81, Figs. 8 and 24, is released from pawl 82, the latter engages the toothed ring 503 on disc 93, thus locking the unit including members 504, 505 and cam 87 to the shaft 501 for rotation therewith. Upon rotation of cam 87, cam follower 89a which is in engagement therewith causes arm 89 and shaft 90 to rotate, thus rotating lever 37 from its lower full line position to its upper phantom line position, thereby raising link 92 to rotate bell crank 93, Fig. 8, in a counterclockwise direction under the bias of spring 94 and thus to rotate arm 95 which is fixed to shaft 91 along with bell crank 93 in a counterclockwise direction to lower the plunger P and move a box from its supported position down onto an adhesive-coated wrapper at the assembly station on the suction conveyor. Continued rotation of cam 87 causes reverse movement of plunger P to its upper position as shown in Fig. 8 against the bias of spring 94.

The linkage for operating latch 81 is shown in Fig. 24 and comprises an arm 510 fixed to a shaft 511 which also has fixed thereto an arm 512 connected to link 513 which is connected to an arm 514 fixed to shaft 75 on the other end of which is arm 74, Fig. 8, connected by link 73 to an arm 72 carrying cam follower 71 which engages a cam 70 fixed to the one-time shaft 61. Accordingly, it will be seen in Figs. 8 and 24 that the wrapping machine M trips the gluer by means of gluer trip cam 39 and within the cycle of the gluer, the cam 70 on the one-time shaft 61 trips the plunger operating mechanism of the registering device R to register a box on a wrapper at the assembly station. Provision is also made for manual tripping of the gluer as by lever 520, Fig. 8, when it is desired to operate the gluer independently of the wrapping machine M, an example of which is at the beginning of a box run to fill the suction conveyor with box and wrapper assemblies prior to operation of the box wrapping machine or for inspection purposes.

Referring again to Figs. 11 and 11A, the elements 280 may be biased to an intermediate box supporting position by a pair of spring means which will permit rotation of elements 280 both above and below the intermediate position. The plunger form and box will rotate the elements 280 downwardly as the plunger is lowered, and the plunger will rotate them upwardly on its return stroke. The elements 280 in this modification will not engage the guides 207 and thus the plunger form 226 need not be notched to clear elements 280 on the return stroke.

As will be recalled from Fig. 8, the valve V in suction line 32 is manually operated to open the line to atmosphere when it is desired to prevent the plunger P from operating. The valve V is also shown in Fig. 16 and is provided with a handle 22 on a shaft 23 extending through the suction conveyor to the opposite side where it carries an arm 24 adapted to engage the stem of valve V. When the conveyor nose is being telescoped, the valve V should be in open position and to insure that this takes place, there is provided an interlock between the conveyor nose and valve V comprising a rod 25 carried at one end by the auxiliary frame section 301 of the conveyor and having its other end adapted to rotate arm 24 against valve V to open the latter as the section 301 is telescoped with respect to the main frame section 300.

While preferred embodiments of this invention have been described and illustrated, it shall be understood that the invention is not limited to the specific arrangements shown, and that changes and modifications may be made within the scope of the appended claims.

What is claimed is:

1. An automatic box wrapping system comprising conveyor means for moving set-up boxes along a straight line path as viewed from above, means for interrupting the movement of the boxes at a predetermined location on said path, suction conveyor means disposed along said straight line path and below said conveyor means for the boxes, means for feeding adhesive-coated wrappers in succession to said suction conveyor means, means for cyclically interrupting the movement of said suction conveyor means each time the center lines of a wrapper are in alignment with and below the center lines of a box at said predetermined location, and registering means for moving the boxes in succession downwardly into register with corresponding wrappers on said suction conveyor means to form assemblies of box structure and partially applied sheet material to be conveyed along said path to a station for transfer to a box wrapping machine.

2. An automatic box wrapping system comprising staying means for cyclically forming stayed boxes, conveyor means for moving the stayed boxes along a path, means for interrupting the movement of the boxes at a predetermined location on said path, suction conveyor means disposed along said path and below said box conveyor means, means for feeding adhesive-coated wrappers in succession to said suction conveyor means, means for cyclically interrupting the movement of said suction conveyor means each time the center lines of a wrapper are in alignment with and below the center lines of a box at said predetermined location, registering means for moving the boxes in succession downwardly into register with corresponding wrappers on said suction conveyor means to form assemblies of box structure and partially applied sheet material, and means operated by said registering means initiating the cycle of said staying means.

3. An automatic box wrapping system comprising conveyor means for moving set-up boxes along a straight line path as viewed from above, means for interrupting the movement of the boxes at a predetermined location on said path, suction conveyor means disposed along said straight line path and below said conveyor means for the boxes, means for feeding adhesive-coated wrappers in succession to one end of said suction conveyor means, means for cyclically interrupting the movement of said suction conveyor means each time the center lines of a wrapper are in alignment with and below the center lines of a box at said predetermined location, means for moving said boxes in succession downwardly into register with corresponding wrappers to form assemblies of box structure and partially applied sheet material, said suction conveyor means conveying the assemblies along said path to a transfer station at the end thereof, means for transferring the box assemblies in succession from the transfer station to a wrapping station, and means at said wrapping station for completing the application of the adhesive-coated wrapper to the box.

4. In an automatic box wrapping system conveyor means for moving set-up boxes along a path, stop means for interrupting the movement of the boxes at a predetermined location on said path, means for feeding adhesive-coated wrappers in succession below said predetermined location, means for cyclically interrupting the movement of the wrappers each time the center lines of a wrapper are in alignment with and below the center lines of a box at said predetermined location, reciprocating means for moving said boxes in succession downwardly into register with corresponding wrappers to form assemblies of box structure and partially applied sheet material, and means for preventing operation of said reciprocating means when no box is at said predetermined location.

5. In an automatic box wrapping system, conveyor means for moving set-up boxes along a path, stop means for interrupting the movement of the boxes at a predetermined location on said path, said stop means including a suction block having a port adapted to be closed by a box at said predetermined location, means for feeding adhesive-coated wrappers in succession below said predetermined location, means for cyclically interrupting the movement of the wrappers each time the center lines of a wrapper are in alignment with and below the center lines of a box at said predetermined location, a reciprocating plunger for moving said boxes in succession downwardly into register with corresponding wrappers to form assemblies of box structure and partially applied sheet material, and suction controlled means preventing initiation of an operation of said plunger when said port is not covered by a box to avoid direct engagement of said plunger with the adhesive-coated surface of a wrapper in alignment below said predetermined location.

6. A box registering device comprising flexible means for supporting a box along opposed sides thereof, means for guiding a box onto said flexible supporting means, a plunger adapted to be inserted within the box to move the box through said flexible supporting means, said flexible supporting means including spaced elements engageable by the boxes and yieldable out of the path thereof to permit the box and said plunger to pass therethrough, and said spaced elements of said flexible supporting means being yieldable out of the path of said plunger during reverse movement of said plunger through said flexible supporting means without obstruction of said plunger.

7. In a box registering device having flexible means for supporting a box along opposed sides thereof, means for guiding a box onto said flexible supporting means, a plunger adapted to be inserted within the box to move the box through said flexible supporting means, said flexible supporting means including spaced elements engageable by the boxes and yieldable out of the path thereof to permit the box and said plunger to pass therethrough, and said flexible supporting means and said plunger being constructed and arranged to permit reverse movement of said plunger through said flexible supporting means without obstruction of said plunger, the improvement wherein said flexible means for supporting a box along opposed sides thereof comprises a pair of coil springs one disposed along each of two opposed sides of the box, the length of said coil springs being at least as great as the length of the boxes to be supported thereon, and said spaced elements comprising the turns of said coil springs.

8. In a box registering device having flexible means for supporting a box along opposed sides thereof, means for guiding a box onto said flexible supporting means, a plunger adapted to be inserted within the box to move the box through said flexible supporting means, said flexible supporting means including spaced elements engageable by the boxes and yieldable out of the path thereof to permit the box and said plunger to pass therethrough, and said flexible supporting means and said plunger being constructed and arranged to permit reverse movement of said plunger through said flexible supporting means without obstruction of said plunger, the improvement wherein said flexible means for supporting a box along opposed edges thereof comprises a pair of coil springs one disposed along and below each of two opposed sides of the box, the length of said coil springs being at least as great as the length of the boxes to be supported thereon, a rod disposed axially of each of said coil springs, a resilient member disposed adjacent the side of each coil spring opposite its box engaging side, each said rod within said coil springs being adapted to hold said coil springs against said resilient member while a box is supported on said coil springs and to permit said coil springs to yield out of the path of the box as it passes therebetween, said coil springs concurrently compressing said resilient means and thereafter being returned to box supporting position by said resilient means.

9. In a box registering device having flexible means for supporting a box along opposed sides thereof, means for guiding a box onto said flexible supporting means, a plunger adapted to be inserted within the box to move the box through said flexible supporting means, said flexible supporting means including spaced elements engageable by the boxes and yieldable out of the path thereof to permit the box and said plunger to pass therethrough, and said flexible supporting means and said plunger being constructed and arranged to permit reverse movement of said plunger through said flexible supporting means without obstruction of said plunger, the improvement wherein said flexible supporting means for supporting a box along opposed sides thereof comprises a pair of rod members disposed along each side of the box and having fixed thereto a plurality of spaced elements engageable by the box, said spaced elements being rotatable about the axes of said rods, means for biasing said spaced elements to a box supporting position, and a form carried by said plunger and adapted to be inserted within the box to assist in moving the box through said flexible supporting means by pivoting said spaced elements out of the box path and against the bias of said biasing means, said form having cut out portions disposed along the sides thereof at locations corresponding to said spaced elements to clear said elements upon reverse movement of said form through said elements preparatory to receiving another box on said supporting means.

10. A box registering device comprising flexible means for supporting the boxes along opposed sides thereof, means for guiding a plurality of boxes in continuous succession onto said flexible supporting means, a plunger adapted to be inserted within the leading box to move the box through said flexible supporting means without disturbing the support of the succeeding boxes on said flexible supporting means, said flexible supporting means including spaced elements engageable by the boxes and yieldable out of the path of the leading box to permit the leading box and said plunger to pass therethrough, said flexible supporting means and said plunger being constructed and arranged to permit reverse movement of said plunger through said flexible supporting means without obstruction of said plunger.

11. In a box registering device comprising flexible means for supporting the boxes along opposed sides thereof, means for guiding boxes in succession onto said flexible supporting means, a plunger adapted to be inserted within the leading box to move the box through said flexible supporting means without disturbing the support of the succeeding boxes, said flexible supporting means including spaced elements engageable by the boxes and yieldable out of the path of the leading box to permit the box and said plunger to pass therethrough, said flexible supporting means and said plunger being constructed and arranged to permit reverse movement of said plunger through said flexible supporting means without obstruction of said plunger, the improvement wherein said plunger is provided with a form to be inserted within the leading box, and said plunger carries a vertical member for engaging the succeeding box and preventing its forward movement while the leading box is being moved through said flexible supporting means by said plunger and during reverse movement of the plunger through said flexible supporting means.

12. A box registering device according to claim 11 wherein there is provided hold-down means for engaging the succeeding box to prevent it from being raised by the plunger form on its reverse movement.

13. In a box registering device comprising flexible means for supporting the boxes along opposed sides thereof, means for guiding boxes in succession onto said flexible supporting means, a plunger adapted to be inserted within the leading box to move the box through said flexible supporting means without disturbing the support of the succeeding boxes, said flexible supporting means including spaced elements engageable by the boxes and yieldable out of the path of the leading box to permit the leading box and said plunger to pass therethrough, said flexible supporting means and said plunger being constructed and arranged to permit reverse movement of said plunger through said flexible supporting means without obstruction of said plunger, the improvement including additional flexible means disposed below said flexible box supporting means to engage the box and aid in holding it on the plunger during the downward stroke thereof.

14. A box registering device according to claim 13 wherein said additional flexible means comprises a brush with flexible bristles.

15. A box registering device comprising flexible means for supporting the boxes along opposed sides thereof, a plunger adapted to be inserted within a box to move the box through said flexible supporting means onto an adhesive-coated wrapper disposed therebelow, and means for stripping the box from the plunger without raising the box from the wrapper, comprising pivoted members disposed on opposite sides of the plunger and adapted to be pivoted by the box and plunger into position above the upper edges of the box when the plunger is at its lowermost position, to strip the box from the plunger as the plunger moves toward its uppermost position and thereafter to swing clear of the top of the box to avoid contact with the box and wrapper assembly.

16. A box registering device according to claim 15 wherein the pivoted stripping members are disposed intermediate the ends of the plunger and the plunger carries vertical guide members for holding said stripping members in predetermined position over the upper edges of the box during the stripping operation.

17. A box registering device according to claim 15 wherein said stripping members are disposed to engage the corners of a box diagonally opposite each other.

18. A box registering device according to claim 15 wherein said stripping members are disposed to engage the four corners of the box.

19. In a box wrapping system a suction conveyor having a registering station thereon, a registering device disposed above said conveyor at said registering station and including a reciprocable plunger for moving boxes down onto said conveyor, means for reciprocating said plunger, a telescoping nose on said conveyor adjacent said registering station comprising a main frame section having an auxiliary frame section adjacent the conveyor nose, an endless belt passing over said frame sections and normally under tension, means for releasing the tension on said belt, structure on said frame sections permitting said frame sections to be slidable relative to each other when the tension on said belt is released, and interlock means operable upon telescoping of said conveyor nose to prevent operation of said plunger by said reciprocating means.

20. An automatic box wrapping system comprising conveyor means for moving set-up boxes along a path, means for interrupting the movement of the boxes at a predetermined location on said path, suction conveyor means disposed along said path and below said box conveyor means, means for feeding adhesive-coated wrappers in succession to said suction conveyor means, means for cyclically interrupting the movement of said suction conveyor means each time the center lines of a wrapper arrive at a position below said predetermined location, registering means for moving the set-up boxes in succession downwardly into register with corresponding wrappers on said suction conveyor means to form assemblies of box structure and partially applied sheet material, and means for adjusting said registering means with respect to said suction conveyor means to insure that said registering means brings each set-up box into precise alignment with respect to the center lines of a wrapper at said predetermined location and thereby compensates for any errors made in preparing the wrappers for said automatic box wrapping system.

21. In an automatic box wrapping system, conveyor means for moving set-up boxes along a path, stop means for interrupting the movement of the boxes at a predetermined location on said path, means for feeding adhesive-coated wrappers in succession below said predetermined location, means for cyclically interrupting the movement of the wrappers each time the center lines of a wrapper arrive at said predetermined location, a reciprocating plunger for moving said boxes in succession downwardly into register with corresponding wrappers to form assemblies of box structure and partially applied sheet material, said stop means and said plunger being carried by a common support, and means for adjusting said support to a position so that the center lines of said plunger and the center lines of the wrapper are in proper alignment with each other to compensate for any errors made in preparing the wrappers for said automatic box wrapping system, and means for locking said structure in said adjusted position to maintain said alignment so that said plunger registers said boxes on said wrappers with the center lines of each in alignment.

References Cited in the file of this patent

UNITED STATES PATENTS

| | | |
|---|---|---|
| 1,251,811 | Peters et al. | Jan. 1, 1918 |
| 1,422,002 | Shaw | July 4, 1927 |
| 1,778,433 | Seatman | Oct. 14, 1930 |
| 1,796,731 | Stokes | Mar. 17, 1931 |
| 1,868,283 | Fleischer | July 19, 1932 |
| 1,929,707 | Mojonnier | Oct. 10, 1933 |
| 2,101,017 | Bebinger | Dec. 7, 1937 |
| 2,111,700 | Stokes | Mar. 22, 1938 |
| 2,301,088 | Stahl | Nov. 3, 1942 |
| 2,542,099 | Stokes | Feb. 20, 1951 |
| 2,608,407 | Briechle | Aug. 26, 1952 |
| 2,655,896 | Elsner | Oct. 20, 1953 |